US011975364B2

(12) United States Patent
Shinagawa et al.

(10) Patent No.: US 11,975,364 B2
(45) Date of Patent: May 7, 2024

(54) COMPONENT TRANSFER DEVICE

(71) Applicants: KEYLEX CORPORATION, Hiroshima (JP); SEKI KOGYO CO., LTD., Hatsukaichi (JP)

(72) Inventors: Ryotaro Shinagawa, Hiroshima (JP); Yuki Funaki, Hiroshima (JP); Kouji Sakota, Hatsukaichi (JP); Seiji Miura, Hatsukaichi (JP); Naoki Oda, Hatsukaichi (JP)

(73) Assignees: KEYLEX CORPORATION, Hiroshima (JP); SEKI KOGYO CO., LTD., Hiroshima (JP)

( * ) Notice: Subject to any disclaimer, the term of this patent is extended or adjusted under 35 U.S.C. 154(b) by 0 days.

(21) Appl. No.: 18/326,533

(22) Filed: May 31, 2023

(65) Prior Publication Data

US 2023/0321693 A1 Oct. 12, 2023

Related U.S. Application Data

(63) Continuation of application No. PCT/JP2021/030322, filed on Aug. 19, 2021.

(30) Foreign Application Priority Data

Dec. 2, 2020 (JP) ................................ 2020-200092
Dec. 9, 2020 (JP) ................................ 2020-203968

(51) Int. Cl.
*B07C 5/06* (2006.01)
*B07B 13/04* (2006.01)

(52) U.S. Cl.
CPC ................ *B07C 5/06* (2013.01); *B07B 13/04* (2013.01); *B07C 2501/0009* (2013.01)

(58) Field of Classification Search
CPC .... B07C 5/06; B07C 2501/0009; B07B 13/04
See application file for complete search history.

(56) References Cited

U.S. PATENT DOCUMENTS 3,294,235 A * 12/1966 Pitkin .................... B30B 15/32 209/540
6,945,384 B2 * 9/2005 Sakota .............. B65G 47/1485 198/690.1
9,486,840 B2 * 11/2016 Nygaard ........... G01N 21/8806

FOREIGN PATENT DOCUMENTS

JP S48-6302 B1 2/1973
JP S58-7730 U 1/1983
(Continued)

OTHER PUBLICATIONS

International Search Report and Written Opinion for PCT/JP2021/030322 dated Oct. 26, 2021 w/English translation (9 pages).

*Primary Examiner* — Michael McCullough
*Assistant Examiner* — Kalyanavenkateshware Kumar
(74) *Attorney, Agent, or Firm* — Alston & Bird LLP

(57) ABSTRACT

A component transfer device includes an integration path through which both of a regular component and a defective component are to be transported, and a sorting gauge that is provided at the downstream end of the integration path and sorts the regular component and the defective component. A discharge path through which the defective component passes extends to incline in the width direction of the integration path. The sorting gauge includes a gauge body, a sorting path extending through the gauge body and into which the regular component is allowed to advance while the defective component is not allowed to advance, and a guide surface that is disposed at the gauge body so as to spread toward the discharge path and that guides the defective component to the discharge path when the defective component comes into contact with the guide surface.

16 Claims, 17 Drawing Sheets

(56) References Cited

FOREIGN PATENT DOCUMENTS

| | | | |
|---|---|---|---|
| JP | S59-171032 | U | 11/1984 |
| JP | S60-122717 | U1 | 8/1985 |
| JP | H09-2643 | A | 1/1997 |
| JP | 2005-154144 | A | 6/2005 |

* cited by examiner

COMPONENT TRANSFER DEVICE

CROSS REFERENCE TO RELATED APPLICATIONS

This application is a bypass Continuation of International Application No. PCT/JP2021/030322, filed Aug. 19, 2021, which international application claims priority to and the benefit of Japanese Application No. 2020-200092, filed Dec. 2, 2020, and Japanese Application No. 2020-203968, filed Dec. 9, 2020; the contents of all of which as are hereby incorporated by reference herein in their respective entireties.

BACKGROUND OF THE INVENTION

1. Field of the Invention

The technology disclosed here belongs to the technical field relating to a component transfer device.

2. Description of the Related Art

In a conventional assembly operation of an automobile, a connector component, such as a bolt, is welded to a workpiece that is constituted by a press-molded steel sheet or the like. This bolt or the like is transferred by a component transfer device. A component transfer device that aligns and transports a large number of components is known (for example, Japanese Unexamined Patent Application Publication No. 9-2643). A large number of components may include a defective component. Component transfer devices are thus required to have a function of sorting defective components and regular components.

For example, Japanese Unexamined Patent Application Publication No. 9-2643 discloses a component transfer device in which a model gate having a passage sectional shape with which only regular components are allowed to pass therethrough is provided at a component transport surface. A component transport surface of a portion where the model gate of the component transport surface is provided is formed by an openable-closable bottom member that can be opened and closed. The component transfer device is provided with an actuator that opens and closes the openable-closable bottom member.

The component transfer device in Japanese Unexamined Patent Application Publication No. 9-2643 is configured such that, when a defective component is jammed in the model gate, a photoelectric sensor detects the jam, and the actuator opens and closes the openable-closable bottom member.

SUMMARY OF THE INVENTION

However, a configuration in which, as in Japanese Unexamined Patent Application Publication No. 9-2643, another power source is provided to discharge a defective component makes a device complicated. In addition, when a jam occurs in a transport path, the power source is actuated to remove a defective component. Consequently, transportation of components is stopped during a time of the jam, which may lead to a decrease in productivity.

The technology disclosed here has been made in consideration of such circumstances, and an object of the technology is to provide a component transfer device capable of sorting regular components and defective components with a configuration that suppresses a decrease in productivity while being simple.

To solve the aforementioned problems, a first aspect of technology disclosed here is intended to provide a component transfer device that is configured to sort and supply a regular component and a defective component that differs in shape from the regular component, the component transfer device comprising an integration path through which both of the regular component and the defective component are to be transported; and a sorting gauge that is provided at a downstream end of the integration path and that is configured to sort the regular component and the defective component. At the downstream end, the integration path diverges into a regular transport path through which the regular component is to be transported and a discharge path through which the defective component is to be discharged. One of the regular transport path and the discharge path extends to incline in a width direction of the integration path with respect to a transport direction at a portion in a vicinity of the sorting gauge of the integration path. The sorting gauge includes a gauge body; a sorting path into which one of the regular component and the defective component is allowed to advance while another one of the regular component and the defective component is not allowed to advance, the sorting path being formed to extend through the gauge body and to be continuous with another one of the regular transport path and the discharge path; and a guide surface that is disposed at a position of an upstream end of the sorting path in the gauge body so as to spread toward the one of the regular transport path and the discharge path, the guide surface being configured to guide the other one of the regular component and the defective component to the one of the regular transport path and the discharge path when the other one of the regular component and the defective component comes into contact with the guide surface.

According to a second aspect of the technology disclosed here, in the first aspect, the sorting path may be formed to extend through an entirety of the gauge body, and the guide surface may be formed at a portion of an outer peripheral surface of the gauge body.

According to a third aspect of the technology disclosed here, in the first or second aspect, the one of the regular transport path and the discharge path may have a groove shape, and the guide surface may be disposed to be continuous with a groove wall of the one of the regular transport path and the discharge path.

According to a fourth aspect of the technology disclosed here, in any one of the first to third aspects, the integration path may be formed such that a transport direction is an up-down direction at least at a portion in a vicinity of the sorting gauge, the other one of the regular transport path and the discharge path may be formed to extend in the up-down direction and to be continuous with the integration path, and the one of the regular transport path and the discharge path may extend downward to obliquely incline so as to separate from the other one of the regular transport path and the discharge path.

According to a fifth aspect of the technology disclosed here, in any one of the first to fourth aspects, the sorting gauge may further include, at a portion of the guide surface on a side far from the one of the regular transport path and the discharge path, a protruding portion that protrudes from the guide surface toward a side opposite to the sorting path, and the other one of the regular component and the defective component may be guided along the guide surface to the one of the regular transport path and the discharge path after coming into contact with the protruding portion and being guided to the guide surface.

According to a sixth aspect of the technology disclosed here, in any one of the first to fifth aspects, components to be transported may be bolts, and the sorting gauge may further include a pair of gate members through which one of the regular component and the defective component is allowed to pass while the other one of the regular component and the defective component is not allowed to pass, the pair of gate members constituting at least a portion of the sorting path, and an angle adjusting mechanism that is configured to be capable of adjusting an angle between the pair of gate members to an angle that corresponds to an angle of a tip of the one of the regular component and the defective component.

According to a seventh aspect of the technology disclosed here, in the sixth aspect, the gate members may be each constituted by a plate-shaped blade member, the angle adjusting mechanism may be constituted by an attaching member that is configured to attach respective one end portions of the gate members to the gauge body and support the respective one end portions, and, when a joining force of the attaching member with respect to the gauge body is reduced, respective other end portions of the gate members may become rotatable around the attaching member as a fulcrum, and, when the joining force of the attaching member with respect to the gauge body is increased, the gate members may be fixed in a state in which the angle between the gate members is a desired angle.

According to an eighth aspect of the technology disposed here, in the sixth or seventh aspect, the gate members may be disposed along the guide surface.

According to the first aspect of the technology disclosed here, for example, in a case where the regular component is allowed to pass through the sorting path and the defective component is not allowed to pass through the sorting path, when the defective component is transported along the integration path, the defective component comes into contact with a portion of the upstream end of the sorting path of the gauge body, in other words, with the guide surface. The defective component that has come into contact with the guide surface is guided along the guide surface to the discharge path by a component transporting force. Meanwhile, since the regular component is allowed to pass through the sorting path, the regular component is transported to the regular transport path without coming into contact with the guide surface. As described above, the regular component and the defective component are sorted by the component transporting force without using another power source. The device configuration is thus simplified. Conversely, in a case where the regular component is not allowed to pass through the sorting path and the defective component is allowed to pass through the sorting path, the regular component comes into contact with the guide surface and is guided to the regular transport path while the defective component passes through the sorting path and is transported to the discharge path. Since a time in which a jam occurs in the integration path is less likely to be generated due to the regular component and the defective component being sorted by the component transporting force, as described above, it is also possible to suppress a decrease in productivity.

According to the second aspect of the technology disclosed here, the guide surface is formed at a portion of the outer peripheral surface of the gauge body. A portion through which a component guided by the guide surface passes is not required to be formed in the sorting gauge. Consequently, the configuration of the sorting gauge can be considerably simplified. Therefore, the device configuration can be further simplified.

According to the third aspect of the technology disclosed here, the flow of the regular component to the regular transport path or the flow of the defective component to the discharge path becomes smooth. Consequently, a possibility of a jam occurring in the integration path is considerably reduced. It is thus possible to further improve the productivity.

According to the fourth aspect of the technology disclosed here, due to the integration path extending in the up-down direction, a component is transported with gravity. Consequently, when a regular component or a defective component comes into contact with the guide surface, the regular component easily receives a force toward the regular transport path or the defective component easily receives a force toward the discharge path, and the regular component or the defective component flows smoothly to the regular transport path or the discharge path. Consequently, it is possible to further improve productivity.

According to the fifth aspect of the technology disclosed here, the regular component or the defective component is shifted from the integration path by the protruding portion, and the regular component and the defective component are thus easily sorted. Consequently, it is possible to further improve productivity.

According to the sixth aspect of the technology disclosed here, the angle between the pair of gate members can be changed in accordance with the tip shape of the regular component or the defective component by the angle adjusting mechanism. For example, when the angle between the pair of gate members is adjusted to correspond to the tip shape of the regular component, the sorting path can be a sorting path through which the regular component is allowed to pass and the defective component is not allowed to pass. When specifications of the regular component are changed to specifications in which the tip shape is different, it is sufficient to change the angle between the pair of gate members in accordance with the tip shape of the regular component after the change. Meanwhile, when the angle between the pair of gate members is adjusted to correspond to the tip shape of the defective component, the sorting path can be a sorting path through which the defective component is allowed to pass and the regular component is not allowed to pass. In this case, in particular, the defective component whose tip is sharper than the tip of the regular component can be removed. Therefore, even when the specifications of the regular component are changed, it is sufficient to change the angle between the pair of gate members by the angle adjusting mechanism, without detaching the sorting gauge. It is thus possible to sort components having new specifications by a simple operation. As a result, it is possible to further improve the productivity.

According to the seventh aspect of the technology disclosed here, it is possible to form a sorting path that corresponds to various types of components with a simple configuration. Therefore, various types of components can be sorted by a simple operation. Consequently, it is possible to further improve productivity.

According to the eighth aspect of the technology disclosed here, one of the regular component and the defective component passes through the sorting path due to a force in the transport direction while the other one of the regular component and the defective component is automatically guided along the guide surface due to the force in the transport direction to the regular transport path or the discharge path after coming into contact with the gate members. Consequently, it is possible to further ease the sorting operation and possible to further improve the productivity.

DESCRIPTION OF THE PREFERRED EMBODIMENTS

Hereinafter, exemplary embodiments will be described with reference to the drawings. Note that description of the following preferable embodiments is merely presented as examples fundamentally.

Embodiment 1

Device Configuration

Figure 1:
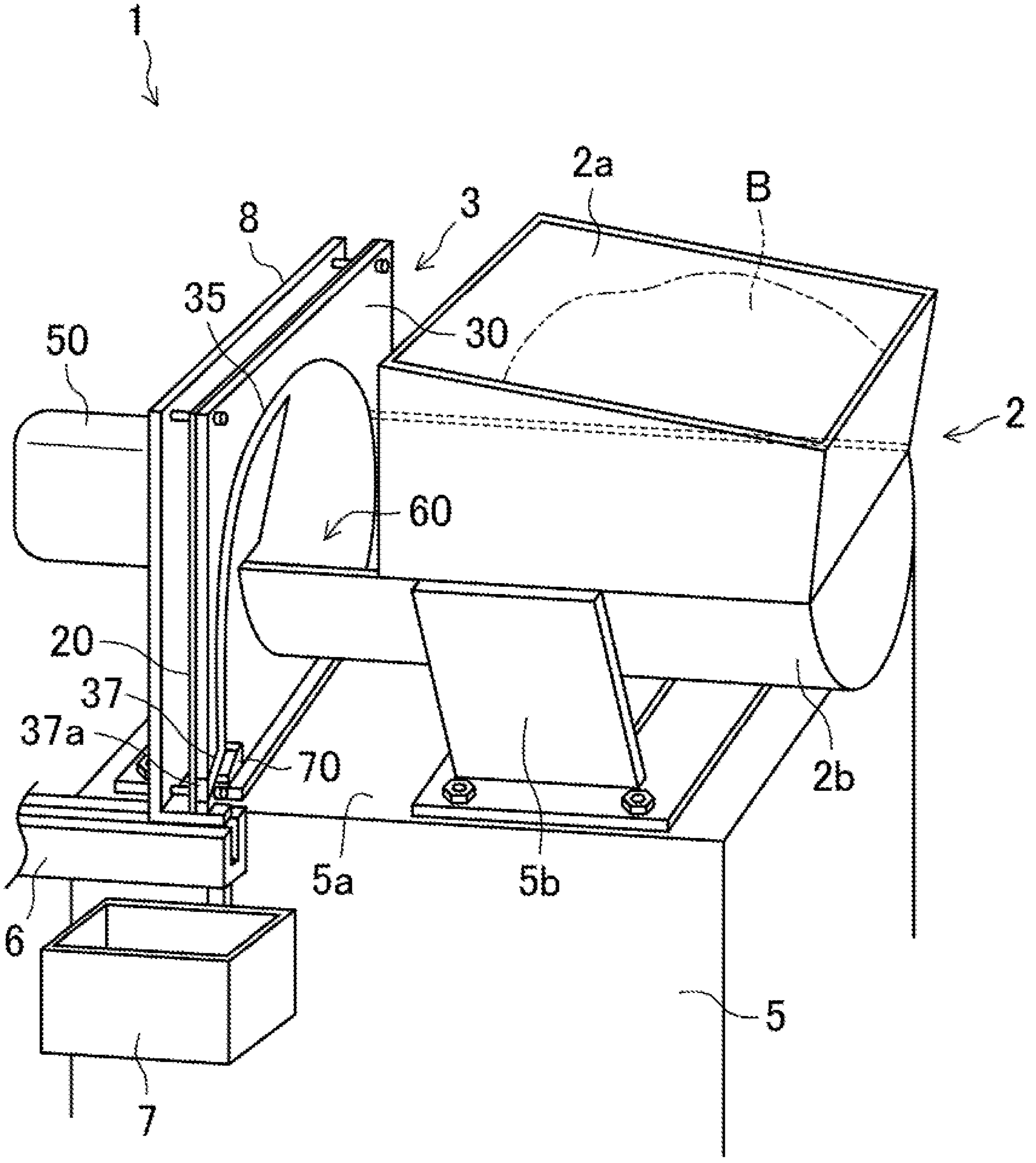
FIG. 1 is a perspective view of a component transfer device according to Embodiment 1.
Figure 2:
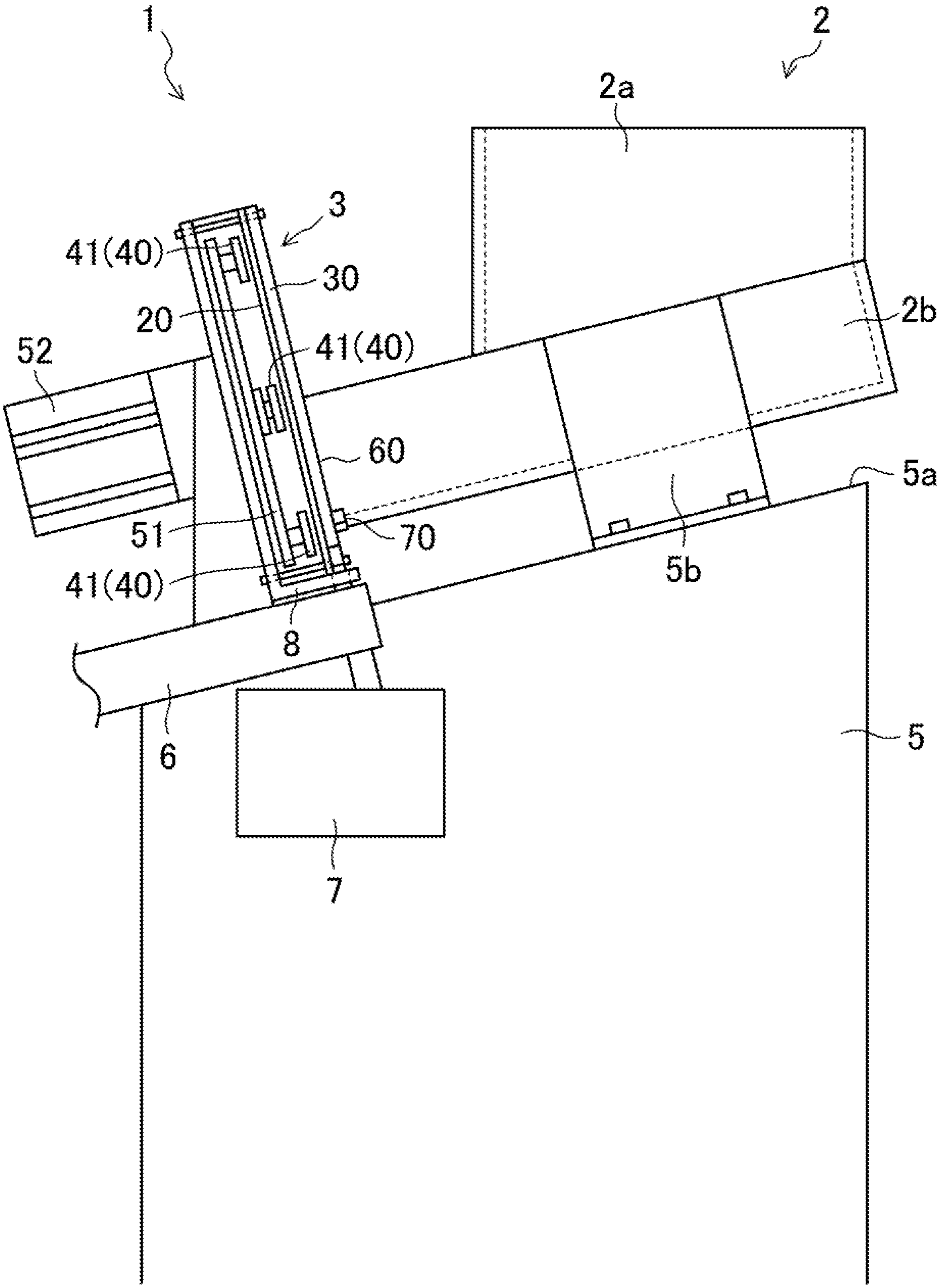
FIG. 2 is a side view of a component transfer device.
Figure 3:
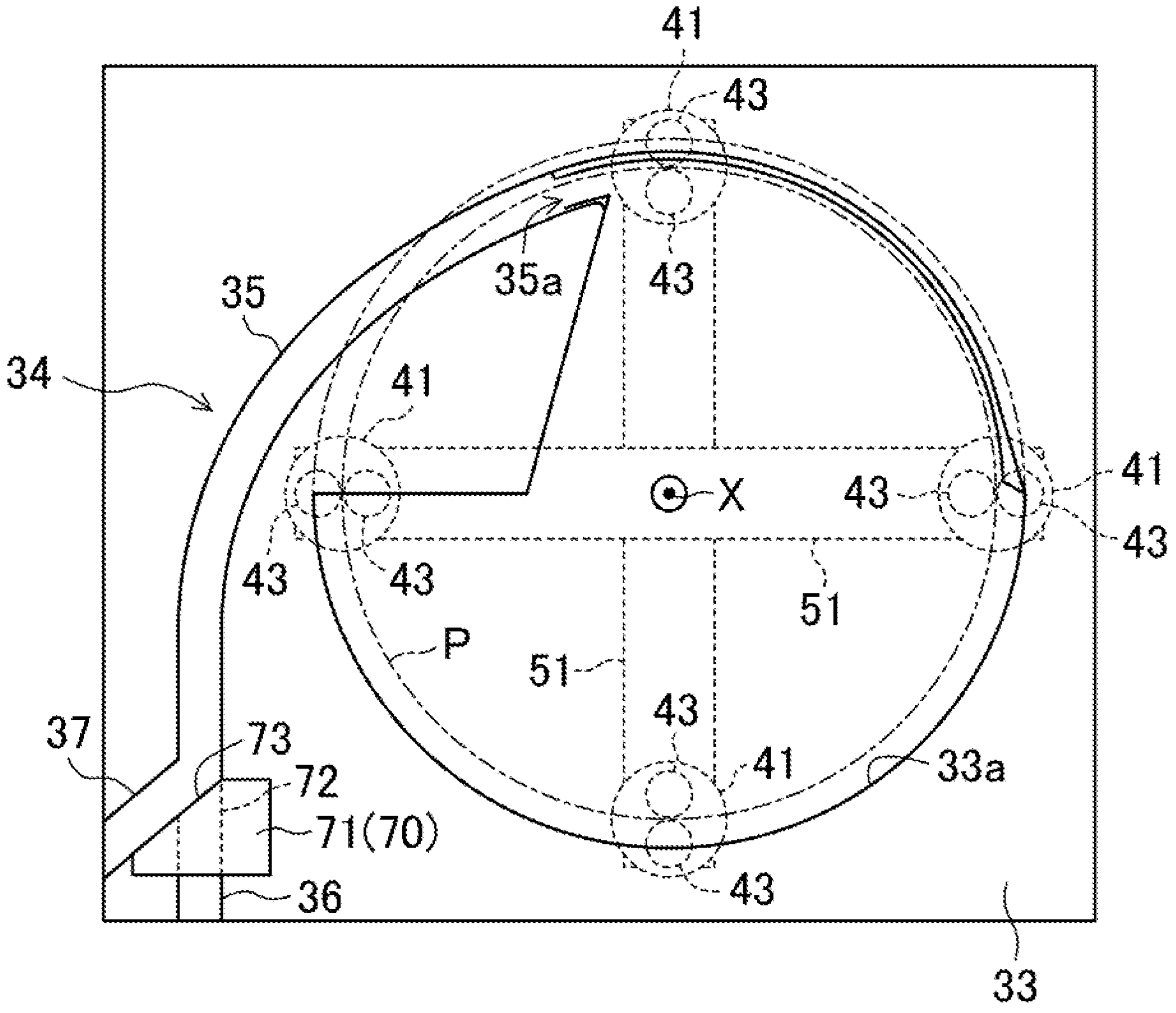
FIG. 3 is a front view of a guide plate.

FIG. 1 to FIG. 3 illustrate a bolt transfer device 1 as a component transfer device. The bolt transfer device 1 includes an input chute 2 that is fixed above a base 5, a device body 3, a rail 6 that is provided lateral to the base 5, and a box 7 in which defective components are to be collected. A large number of bolts B in a loose state are to be input into the input chute 2. The device body 3 converts the orientations of the heads of the bolts B input into the input chute 2 into unified orientations and transports the bolts B to the rail 6. The bolts B are transported along the rail 6 to a bolt supply device (not illustrated). Note that the input chute 2 side may be referred to as the front side and the device body 3 side may be referred to as the rear side in the following description. In addition, the right side and the left side when the rear side is viewed from the front side may be referred to as the right side and the left side, respectively.

The input chute 2 includes a hopper cylindrical portion 2*a* that opens upward and downward and a tub-shaped chute portion 2*b* whose upper surface is open and whose cross-sectional shape is substantially semicircular. The chute portion 2*b* is fixed to an upper surface of the base 5 by a bracket 5*b*. The hopper cylindrical portion 2*a* is integral with the chute portion 2*b*. Here, the upper surface of the base 5 is constituted by an inclined surface 5*a* that is inclined downward toward the rear side. The chute portion 2*b* is thus in an orientation inclined along the inclined surface 5*a*. A front portion of the chute portion 2*b* is in communication with an opening at the lower end of the hopper cylindrical portion 2*a*. The bolts B that are input into the hopper cylindrical portion 2*a* move to the chute portion 2*b* through this opening. The bolts B that have moved to the chute portion 2*b* move along the slope of the chute portion 2*b* toward the rear side.

The device body 3 is fixed at a low position (a position on the rear side) at the inclined surface 5*a*. The device body 3 includes a face plate 20. The face plate 20 has a rectangular shape that extends orthogonally to the inclination direction of the chute portion 2*b*. The face plate 20 is disposed such that the front surface thereof faces the input chute 2 side (front side) and inclines obliquely upward. A tip portion (rear end portion) of the chute portion 2*b* is connected to a lower portion of the front surface of the face plate 20. Consequently, as illustrated in FIG. 1, a lower portion at the front surface side of the face plate 20 is provided with a bolt storage portion 60 that is surrounded by the face plate 20 and the chute portion 2*b*. In the bolt storage portion 60, a plurality of the bolts B are to be stored in a non-aligned state.

As illustrated in FIG. 2, the device body 3 includes a plurality of attracting means 40. The attracting means 40 are provided at the rear side of the face plate 20. The attracting means 40 form a magnetic field to thereby cause, among the bolts B positioned in the bolt storage portion 60, the bolts B close to the face plate 20 to be attracted onto the face plate 20.

As illustrated in FIG. 3, the attracting means 40 each include a rotary head 41. The rotary head 41 includes a pair of substantially columnar permanent magnets 43 for forming a magnetic field.

The device body 3 includes a rotation driving means 50. As illustrated in FIG. 2, the rotation driving means 50 includes a holder 51 and a motor 52 as a driving unit. The holder 51 is constituted by two plate members that are assembled into a cross shape centered at a center axis X orthogonal to the face plate 20. The attracting means 40 are attached one each to four tip portions of the holder 51. The motor 52 is disposed such that a rotary shaft thereof extends on the center axis X. The rotary shaft of the motor 52 extends through a support plate 8 that is provided at a rear surface 22 side of the face plate 20. A front end portion of the rotary shaft of the motor 52 is fixed at the position of the center of the holder 51.

The motor 52 rotates the holder 51 around the center axis X. Consequently, the attracting means 40 rotationally move around the center axis X. At this time, the midpoint of the pair of permanent magnets 43 in each of the attracting means 40 describes a rotational trajectory that passes a specific circumferential line P centered at the center axis X. In other words, the holder 51 of the rotation driving means 50 holds the attracting means 40 on the specific circumferential line P. The motor 52 of the rotation driving means 50 rotates the holder 51 around the center axis X to thereby rotationally move the attracting means 40 along the specific circumferential line P. Consequently, the bolts B that have been attracted onto the face plate 20 by being attracted by the magnetic field of the attracting means 40 rotationally move to a predetermined position at an upper portion of the front surface of the face plate 20.

In the present embodiment, the attracting means 40 rotate counterclockwise in view from the front side. The bolt storage portion 60 is positioned at a lower part of the specific circumferential line P. In other words, the attracting means 40 pass the rear side of the bolt storage portion 60. Specifically, the attracting means 40 pass the rear side with respect to the bolt storage portion 60 with the face plate 20 interposed therebetween. Consequently, the bolts B stored in the bolt storage portion 60 are attracted through the face plate 20 by the attracting means 40.

The device body 3 includes a guide plate 30. The guide plate 30 has a rectangular shape similar to the face plate 20. The guide plate 30 is superposed on the front surface of the face plate 20 and fixed to the face plate 20. The bolts B attracted by the attracting means 40 onto the front surface of the face plate 20 move on the front surface of the face plate 20 with the rotational movement of the attracting means 40 by being attracted by the attracting means 40. The thickness of the guide plate 30 is smaller than the lengths of the bolts B.

As illustrated in FIG. 3, an opening portion 33 that extends through the guide plate 30 in the plate thickness direction is provided near the center of the guide plate 30. A lower portion of an opening edge portion 33*a* of the opening portion 33 has a substantially arc shape that corresponds to the cross-sectional shape of the chute portion 2*b*. The opening edge portion 33*a* is positioned on the outer peripheral side with respect to the specific circumferential line P. The opening edge portion 33*a* guides the bolts B attracted by the attracting means 40 to a transport path 34, which is described later.

The transport path 34 for transport the bolts B to the rail 6 is provided at the left side of the opening portion 33 of the guide plate 30. The transport path 34 includes an integration path 35 through which all of the bolts B pass. The integration path 35 has a shape of a groove that is open on the front side. The face plate 20 forms a bottom portion of the groove of the integration path 35. In other words, the integration path 35 is formed by the cooperation of the guide plate 30 and the face plate 20. Although not illustrated, a rear half part (a part on the face plate 20 side) of the integration path 35 has a width of a degree that allows passage of a head of each of the bolts B while the front half part of the integration path 35 has a width that is narrower than the head of each of the bolts B and wider than a shaft portion of each of the bolts B. The upstream end of the integration path 35 has an input port 35*a* that is open at the opening edge portion 33*a*. The bolts B that have been attracted by the attracting means 40 and transported are input into the input port 35*a*. The input port 35*a* also has a groove shape such as that described above. Therefore, the bolts B that are input through the input port 35*a* are each in an orientation in which the head thereof is positioned on the rear side (the face plate 20 side) and the shaft portion thereof is positioned on the front side. Since the thickness of the guide plate 30 is smaller than the lengths of the bolts B, the bolts B that have advanced into the integration path 35 are each in a state in which a tip part of the shaft portion protrudes forward from the integration path 35 (refer to FIG. 8). All of the bolts B that pass through the integration path 35 include a regular bolt RB that satisfies a predetermined shape standard and a defective bolt BB that does not satisfy the shape standard.

A part of the integration path 35 in the vicinity of the input port 35*a* extends in the tangential direction of the opening edge portion 33*a*. The integration path 35 extends leftward from the input port 35*a* to curve downward and then extends downward straightly. In other words, a portion of the integration path 35 is formed such that the transport direction is the up-down direction.

The downstream end of the integration path 35 diverges into a regular transport path 36 and a discharge path 37. The regular transport path 36 is a path through which the regular bolt RB is transported. The discharge path 37 is a path for discharging the defective bolt BB. Similarly to the integration path 35, the regular transport path 36 and the discharge path 37 each have a shape of a groove that is open on the front side. Similarly to the integration path 35, the bottom portion of the groove of each of the regular transport path 36 and the discharge path 37 is also formed by the face plate 20. In other words, the regular transport path 36 and the discharge path 37 are also formed by the cooperation of the guide plate 30 and the face plate 20. Similarly to the integration path 35, a rear part of each of the regular transport path 36 and the discharge path 37 has a width of a degree that allows passage of the head of each of the bolts B while a front part thereof has a width that is narrower than the head of each of the bolts B and wider than the shaft portion of each of the bolts B. In addition, since the thickness of the guide plate 30 is smaller than the length of each of the bolts B, the regular bolt RB that passes through the regular transport path 36 and the defective bolt BB that passes through the discharge path 37 are each in a state in which tip parts of respective shaft portions protrude forward from the regular transport path 36 and the discharge path 37 (refer to FIG. 8).

The regular transport path 36 is continuous with the downstream end of the integration path 35 and extends downward straightly. The downstream end of the regular transport path 36 is open at a lower end portion of the guide plate 30.

The discharge path 37 extends in the groove width direction of the integration path 35 so as to incline to separate from the regular transport path 36. Specifically, the discharge path 37 extends downward to incline leftward. The downstream end of the discharge path 37 serves as a discharge port 37*a* that is open at a side end, more specifically, a left side end portion of the guide plate 30.

A portion diverging into the regular transport path 36 and the discharge path 37, that is, the downstream end of the integration path 35 is provided with a sorting gauge 70 that sorts the regular bolt RB and the defective bolt BB. The configuration of the sorting gauge 70 is described later.

The rail 6 is positioned below the opening at the downstream end of the regular transport path 36. The groove width of the rail 6 is set to a width that is larger than the shaft portion of the regular bolt RB and smaller than the head thereof. The head of the regular bolt RB that has passed through the regular transport path 36 and dropped onto the rail 6 is caught by an upper surface portion of the rail 6, and the regular bolt RB rotates around the caught head as a fulcrum such that the shaft portion thereof is inserted into the groove. Consequently, the regular bolt RB is set in the rail 6. The regular bolt RB set in the rail 6 is transported along the rail 6 to a component supply device.

The defective bolt BB that has passed through the discharge path 37 and has been discharged through the discharge port 37*a* is input into the box 7. Along an extension line of the discharge path 37, the defective bolt BB that has been discharged through the discharge port 37*a* passes the upper side of the rail 6 and is input into the box 7. The box 7 is configured to be detachable from the base 5.

Sorting Gauge

Next, the configuration of the sorting gauge 70 will be described in detail. Note that, in the following description, front-rear, up-down, and left-right directions are front-rear, up-down, and left-right directions when the sorting gauge 70 is attached to the above-described bolt transfer device 1 and are not intended to limit the attached manner of the sorting gauge 70.

Figure 4:
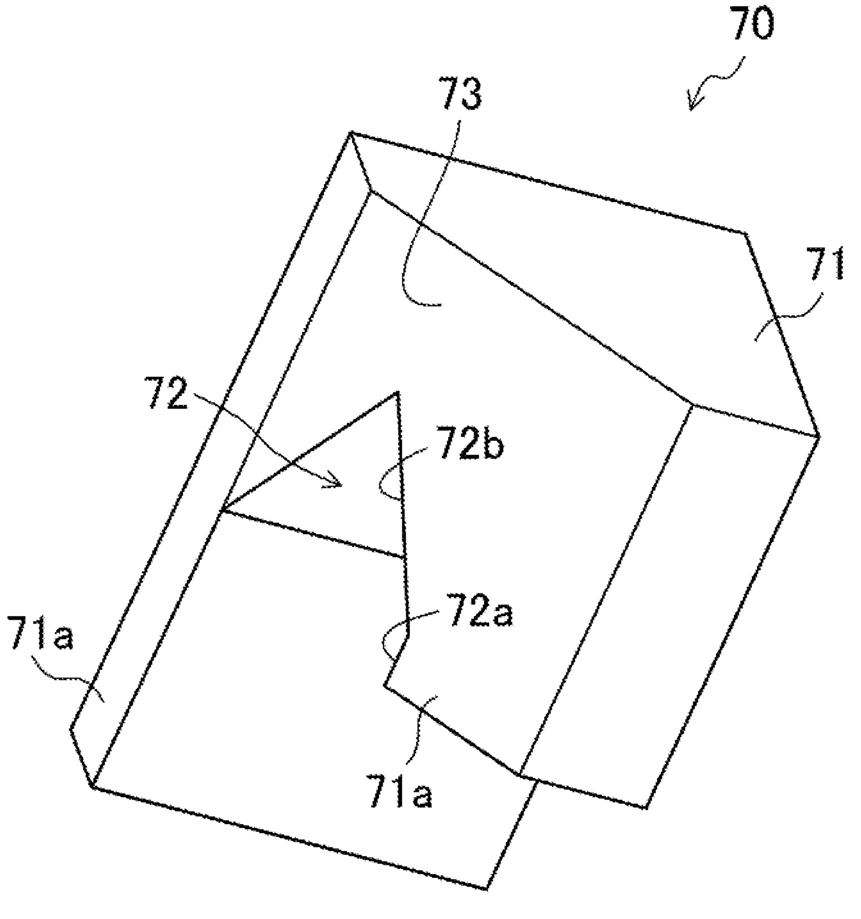
FIG. 4 is a perspective view of a sorting gauge.
Figure 5:
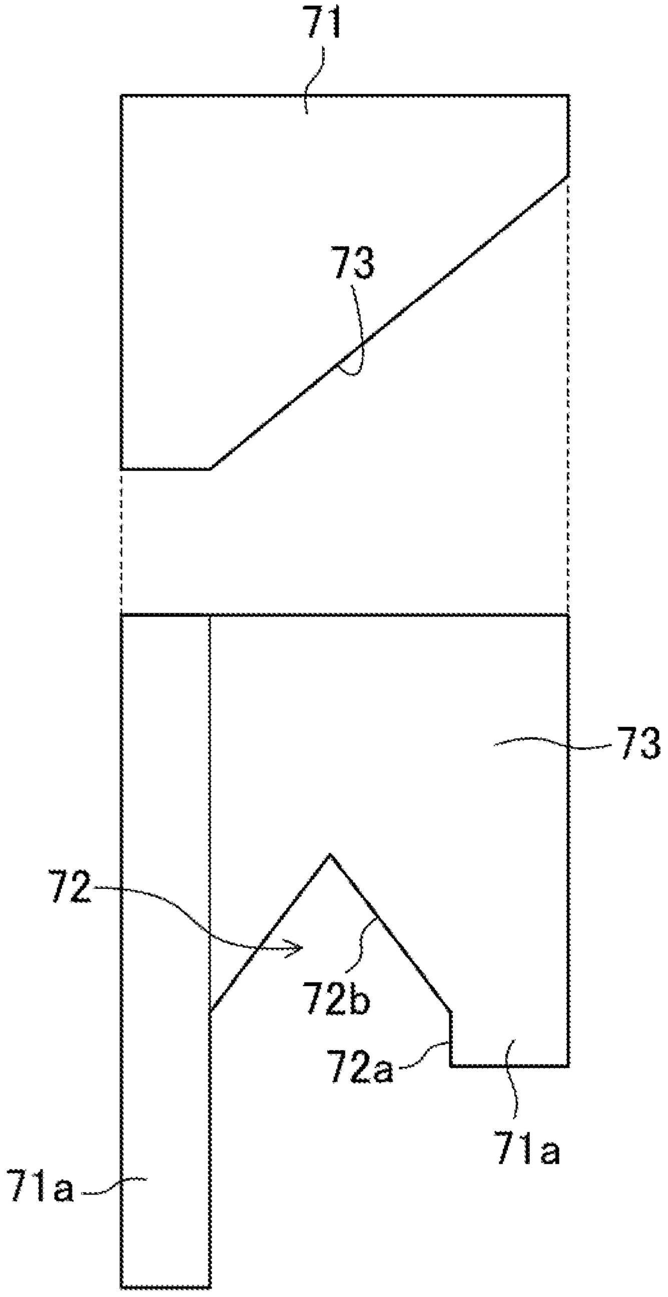
FIG. 5 is a two-side view of the sorting gauge viewed from the front side and the upstream side in a transport direction.

As illustrated in FIG. 4 and FIG. 5, the sorting gauge 70 is constituted by a machined block body that is made of metal. The sorting gauge 70 includes a gauge body 71, a sorting path 72 formed to extend through the gauge body 71, and a guide surface 73 formed at a portion of the outer peripheral surface of the gauge body 71. As illustrated in FIG. 3, the sorting gauge 70 is disposed at the downstream end of the integration path 35.

Figure 8:
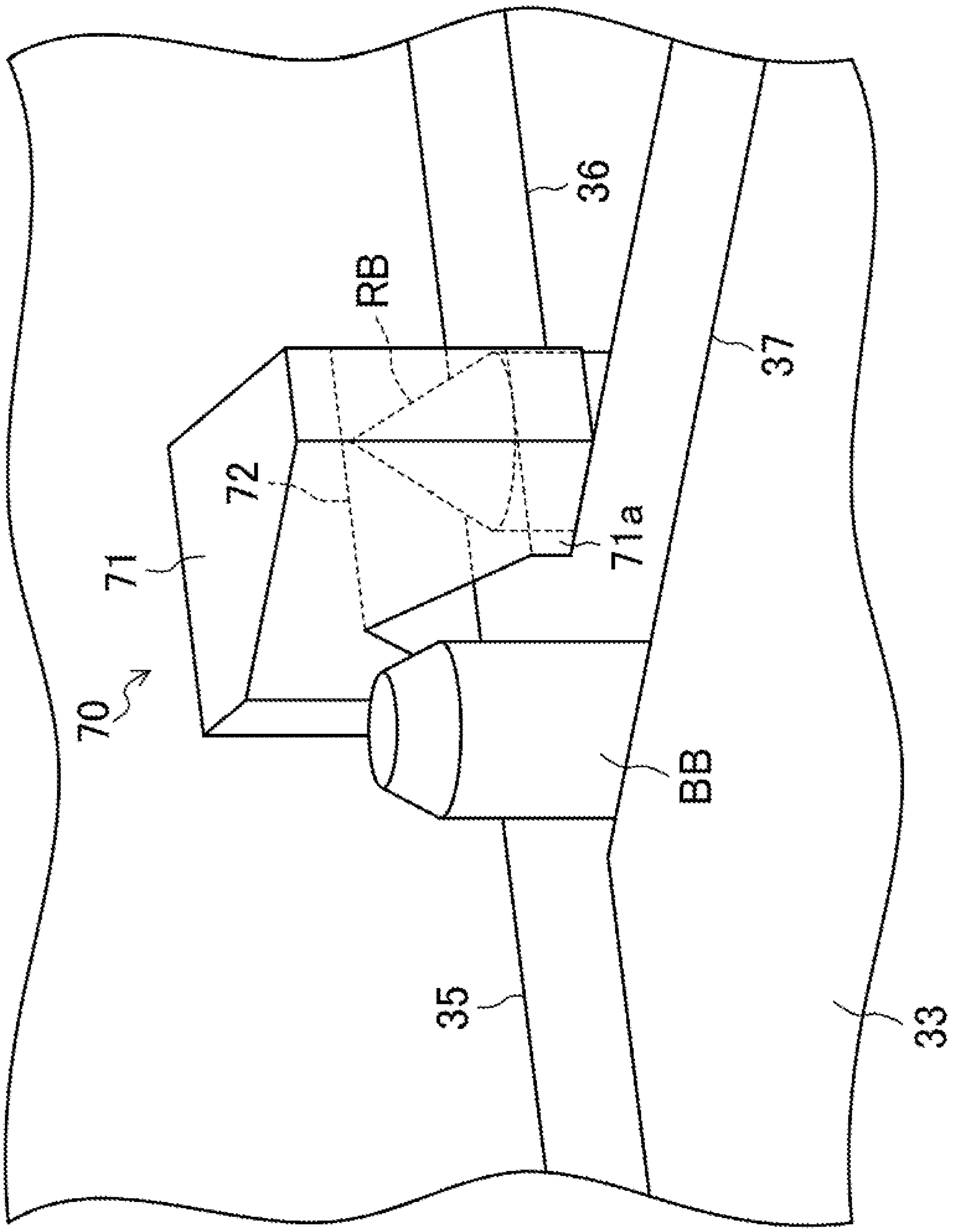
FIG. 8 is a perspective view illustrating a state of a regular component that has advanced into the sorting path.

As illustrated in FIG. 5, the gauge body 71 has a trapezoidal shape in front view. The gauge body 71 includes a pair of leg portions 71*a* that constitutes a portion of the sorting path 72. The upper surface of the left leg portion 71*a* constitutes a portion of the guide surface 73. As illustrated in FIG. 8, the rear surface of the left leg portion 71*a* is detachably fixed to the front surface of the guide plate 30. The right leg portion 71*a* is longer than the left leg portion 71*a*. Although not illustrated in detail, the right leg portion 71*a* is inserted into a recessed portion provided on the guide plate 30. In a state of being inserted into the recessed portion, the right leg portion 71*a* has a left surface (a portion that forms the sorting path 72) that is flush with the right front surface of the integration path 35 and the right front surface of the regular transport path 36. Consequently, the integration path 35, the sorting path 72, and the regular transport path 36 are in a continuous state except for the diverge portion of the discharge path 37. The right leg portion 71*a* is also detachably fixed to the guide plate 30.

The sorting path 72 is formed to extend through (here, extend through in the up-down direction) the entirety of the gauge body 71. The sorting path 72 has been machined into a shape into which the regular bolt RB is allowed to advance while the defective bolt BB is not allowed to advance. Specifically, as illustrated in FIG. 5, the sorting path 72 has a shape that imitates the shape of the tip portion of the shaft portion of the regular bolt RB in view from the upstream side. In the present embodiment, a shape having a pointed tip portion is assumed to be the shape of the regular bolt RB. The sorting path 72 thus includes a parallel portion 72*a* that slightly extends forward straightly and a tapered portion 72*b* whose a left-right width decreases forward. The shape of the sorting path 72 may be set in accordance with the shape of the regular bolt RB. The parallel portion 72*a* is constituted by the leg portions 71*a* of the gauge body 71. The left-right width of the parallel portion 72*a* is the same as the width of a front end portion of the regular transport path 36. The tapered portion 72*b* is formed to be slightly wider than the tip portion of the regular bolt RB. The sorting path 72 is disposed to be continuous with the regular transport path 36.

Figure 6:
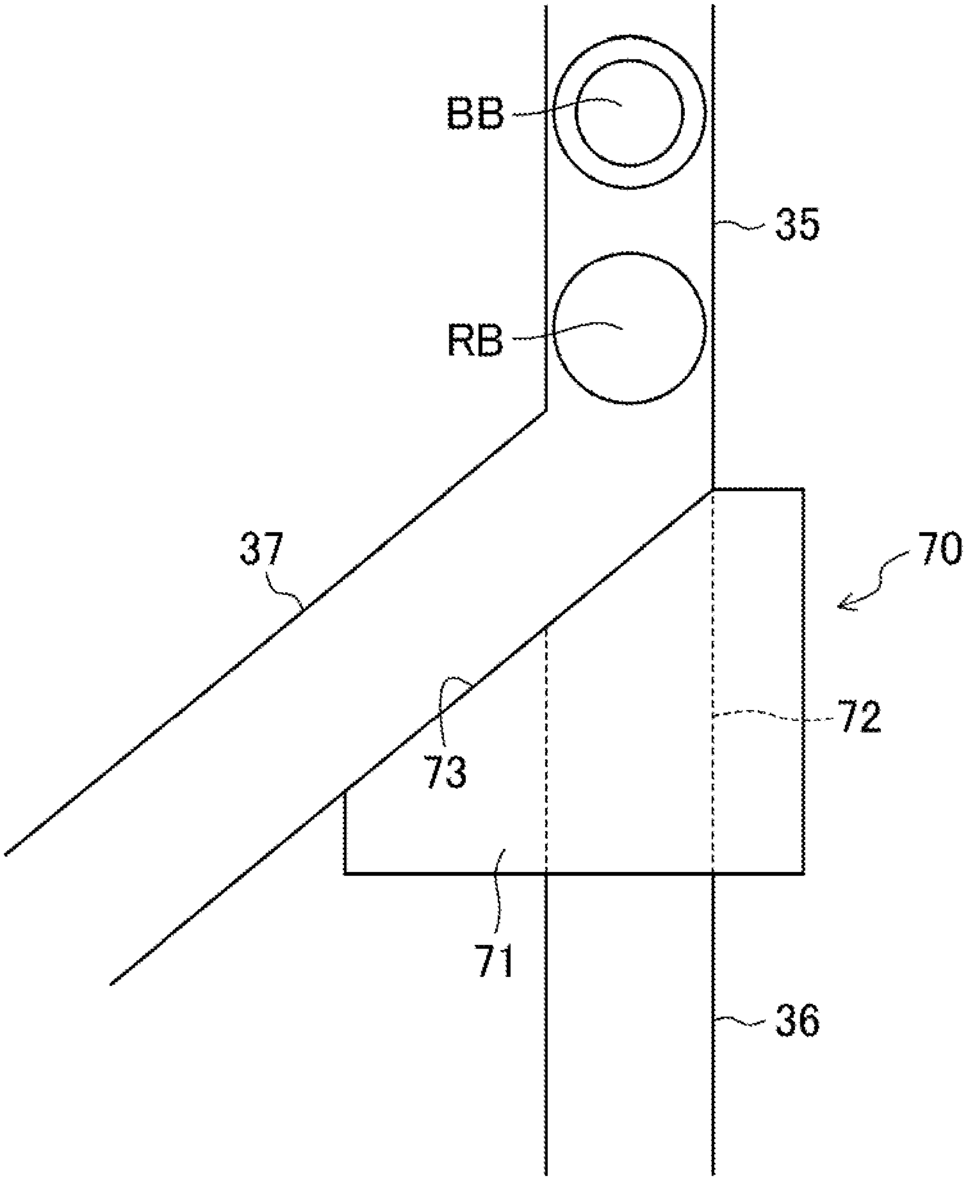
FIG. 6 is an operational view illustrating a status in which components are sorted by a sorting gauge and illustrates a state of the components being transported along an integration path.
Figure 7:
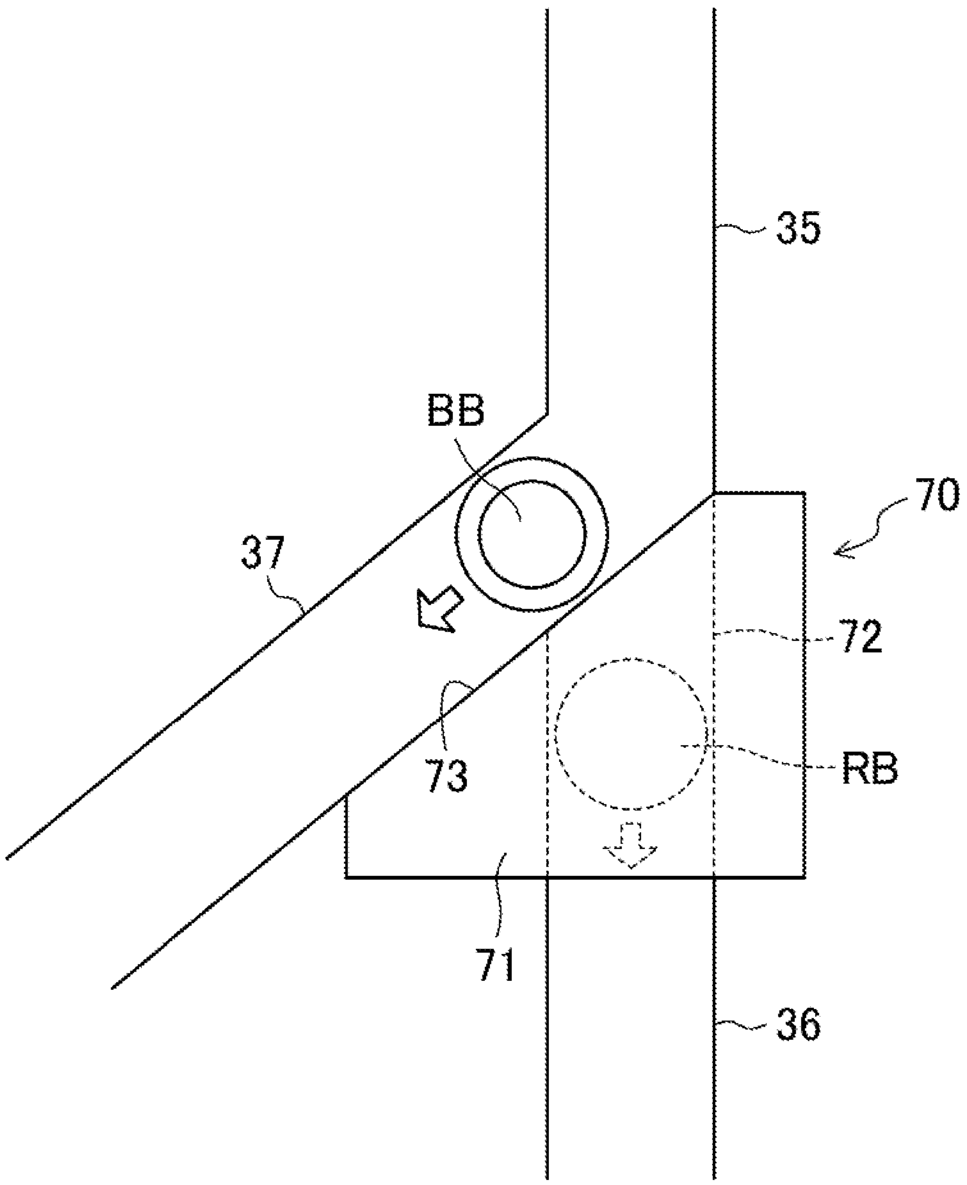
FIG. 7 is an operational view illustrating a status in which components are sorted by a sorting gauge and illustrates a state of a regular component advancing into a sorting path and a defective component being guided to a discharge path by a guide surface.

The guide surface 73 is constituted by an upper inclined surface of the gauge body 71. In other words, the guide surface 73 is formed at the position of the upstream end of the sorting path 72 in the gauge body 71. As illustrated in FIG. 6 to FIG. 8, the guide surface 73 is disposed so as to spread toward the discharge path 37. More specifically, the guide surface 73 is disposed to be continuous with the lower-front groove wall of the discharge path 37. In particular, the guide surface 73 positioned at the front side of the discharge path 37 is disposed so as to be flush with the lower-front groove wall of the discharge path 37. The guide surface 73 is disposed over the entirety in the groove width direction of the integration path 35.

Next, sorting of the regular bolt RB and the defective bolt BB by the sorting gauge 70 will be described. Note that it is assumed that the tip of the defective bolt BB has, as illustrated in FIG. 8, a frustoconical shape.

First, as illustrated in FIG. 6, the regular bolt RB and the defective bolt BB flow through the integration path 35. At this time, the regular bolt RB and the defective bolt BB are in a state in which respective tip portions protrude from the integration path 35. The regular bolt RB and the defective bolt BB move through the integration path 35 so as to naturally drop due to gravity.

Next, as illustrated in FIG. 7, the regular bolt RB and the defective bolt BB reach the position of the sorting gauge 70. At this time, the regular bolt RB advances into the sorting path 72. Thereafter, the regular bolt RB advances into the regular transport path 36. After passing through the regular transport path 36, the regular bolt RB enters the rail 6 and is transported.

Meanwhile, the defective bolt BB comes into contact at the tip thereof with the guide surface 73. By coming into contact with the guide surface 73, the defective bolt BB receives a lateral force. Consequently, the defective bolt BB is guided along the guide surface 73 downward obliquely to the left, that is, toward the discharge path 37. After advancing into the discharge path 37, the defective bolt BB moves along the discharge path 37 due to gravity and is discharged through the discharge port 37*a*. After discharged through the discharge port 37*a*, the defective bolt BB enters the box 7.

As described above, the bolts B input from the bolt storage portion 60 into the integration path 35 use the force of moving through the integration path 35 to be sorted into the regular bolt RB and the defective bolt BB by the sorting gauge 70.

SUMMARY

According to Embodiment 1, the bolt transfer device 1 includes the integration path 35 through which both of the regular bolt RB and the defective bolt BB are to be transported, and the sorting gauge 70 that is provided at the downstream end of the integration path 35 and sorts the regular bolt RB and the defective bolt BB. The integration path 35 diverges at the downstream end into the regular transport path 36 through which the regular bolt RB is to be transported and the discharge path 37 through which the defective bolt BB is to be discharged. The discharge path 37 extends to incline in the groove width direction of the integration path 35 with respect to the transport direction at a portion in the vicinity of the sorting gauge 70 of the integration path 35. The sorting gauge 70 includes the gauge body 71, the sorting path 72 formed to extend through the gauge body 71 and to be continuous with the regular transport path 36 and into which the regular bolt RB is allowed to advance while the defective bolt BB is not allowed to advance, and the guide surface 73 that is disposed at the position of the upstream end of the sorting path 72 in the gauge body 71 so as to spread toward the discharge path 37 and that guides the defective bolt BB to the discharge path 37 when the defective bolt BB comes into contact with the guide surface 73. Consequently, when the bolts B are transported along the integration path 35, the regular bolt RB passes through the sorting path 72 and advances into the regular transport path 36 while the defective bolt BB comes into contact with the guide surface 73 and is guided along the guide surface 73 to the discharge path 37 by the force of transporting the defective bolt BB. As described above, the bolts B are automatically sorted into the regular bolt RB and the defective bolt BB by the force of transporting, which eliminates the need of another power source and can simplify the device configuration. In addition, since a time in which a jam occurs in the integration path 35 is less likely to be generated, it is also possible to suppress a decrease in productivity.

In Embodiment 1, the sorting path 72 is formed to extend through the entirety of the gauge body 71, and the guide surface 73 is formed at a portion of the outer peripheral surface of the gauge body 71. Consequently, a portion through which the defective bolt BB guided by the guide surface 73 passes is not required to be formed in the sorting gauge 70. As a result, the configuration of the sorting gauge 70 can be considerably simplified. Therefore, the device configuration can be further simplified.

In Embodiment 1, the guide surface 73 is disposed continuous with the groove wall of the discharge path 37. The flow of the defective bolt BB to the discharge path 37 becomes smooth. Consequently, the possibility of a jam occurring in the integration path 35 is considerably reduced, which can further improve the productivity.

In Embodiment 1, the integration path 35 is formed such that the transport direction is the up-down direction at a portion in the vicinity of the sorting gauge 70, the regular transport path 36 is formed to extend to be continuous with the integration path 35, and the discharge path 37 extends downward to obliquely incline so as to separate from the regular transport path 36. Consequently, the bolts B are transported with gravity. Therefore, when the defective bolt BB comes into contact with the guide surface 73, a force toward the discharge path 37 is easily applied to the defective bolt BB. As a result, the defective bolt BB flows to the discharge path 37 smoothly, which can further improve the productivity.

In Embodiment 1, the sorting path 72 includes a portion (the parallel portion 72*a*) corresponding to the shaft portion, which is a portion common to the regular bolt RB and the defective bolt BB, and a portion (the tapered portion 72*b*) corresponding to the tip portion, which is a portion that differs between the regular bolt RB and the defective bolt BB. Consequently, an area in which the defective bolt BB comes into contact with the guide surface 73 can be increased as much as possible. As a result, the defective bolt BB is easily guided to the discharge path 37, which can further improve the productivity.

Embodiment 2

Hereinafter, Embodiment 2 will be described in detail. In the following description, portions that are common to Embodiment 1 are given the same reference signs and will not be described in detail.

Figure 9:
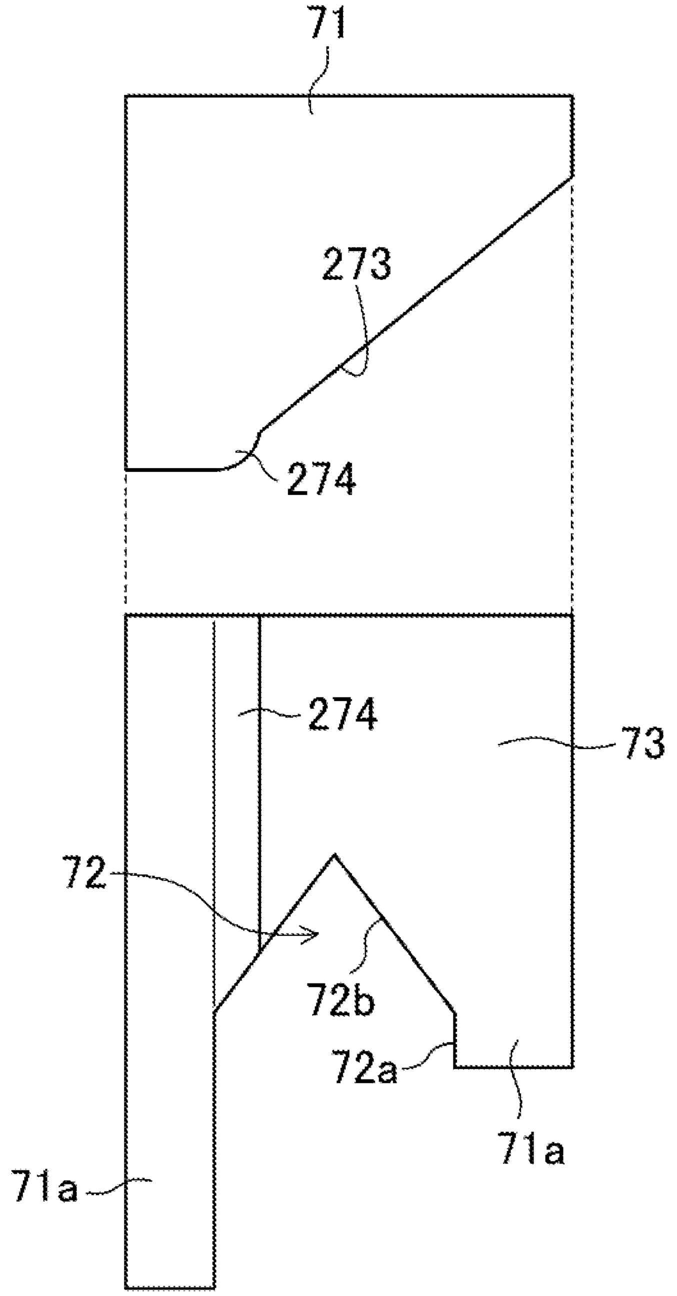
FIG. 9 is a two-side view of a sorting gauge according to Embodiment 2 viewed from the front side and the upstream side in a transport direction.

Embodiment 2 differs from Embodiment 1 in that the sorting gauge 70 is provided with a protruding portion 274 that protrudes from a guide surface 273 toward a side opposite to the sorting path 72. Specifically, as illustrated in FIG. 9 and FIG. 10, the guide surface 273 includes the protruding portion 274 at an end portion (here, the right end portion) of the guide surface 273 on the side far from the discharge path 37.

The protruding portion 274 has a curved surface that is curved downward smoothly toward the left in front view. The protruding portion 274 is formed over the entirety of the guide surface 273 in the front-rear direction. The protruding portion 274 is disposed so as to enter the integration path 35.

Figure 10:
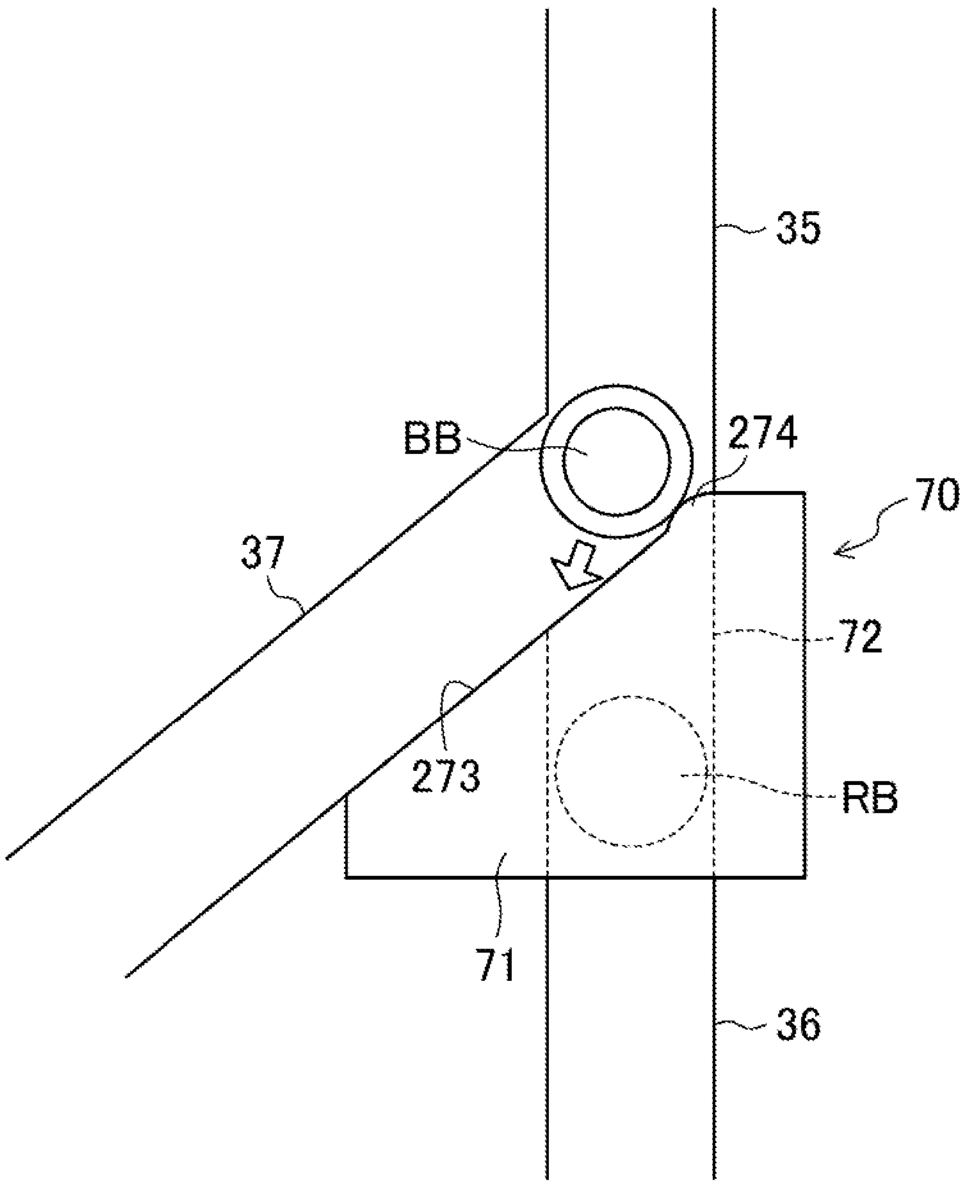
FIG. 10 is an operational view illustrating a status in which components are sorted by the sorting gauge according to Embodiment 2 and illustrates a state of a regular component advancing into a sorting path and a defective component being shifted from an integration path by a protruding portion.

As illustrated in FIG. 10, due to the provision of the protruding portion 274, the defective bolt BB that has moved through the integration path 35 first comes into contact with the protruding portion 274. The force of the defective bolt BB moving through the integration path 35 is converted into a force toward the discharge path 37 by the protruding portion 274. Consequently, the defective bolt BB is guided by the guide surface 273 while being shifted toward the discharge path 37. Thereafter, the defective bolt BB comes into contact with the guide surface 273 and is guided along the guide surface 273 to the discharge path 37.

Therefore, sorting of the regular component and the defective component is easily performed in Embodiment 2 since the defective bolt BB is shifted from the integration path 35 by the protruding portion 274. Consequently, it is possible to improve the productivity and possible to improve sorting accuracy.

Embodiment 3

Hereinafter, Embodiment 3 will be described in detail. In the following description, portions that are common to Embodiments 1 and 2 are given the same reference signs and will not be described in detail.

Figure 11:
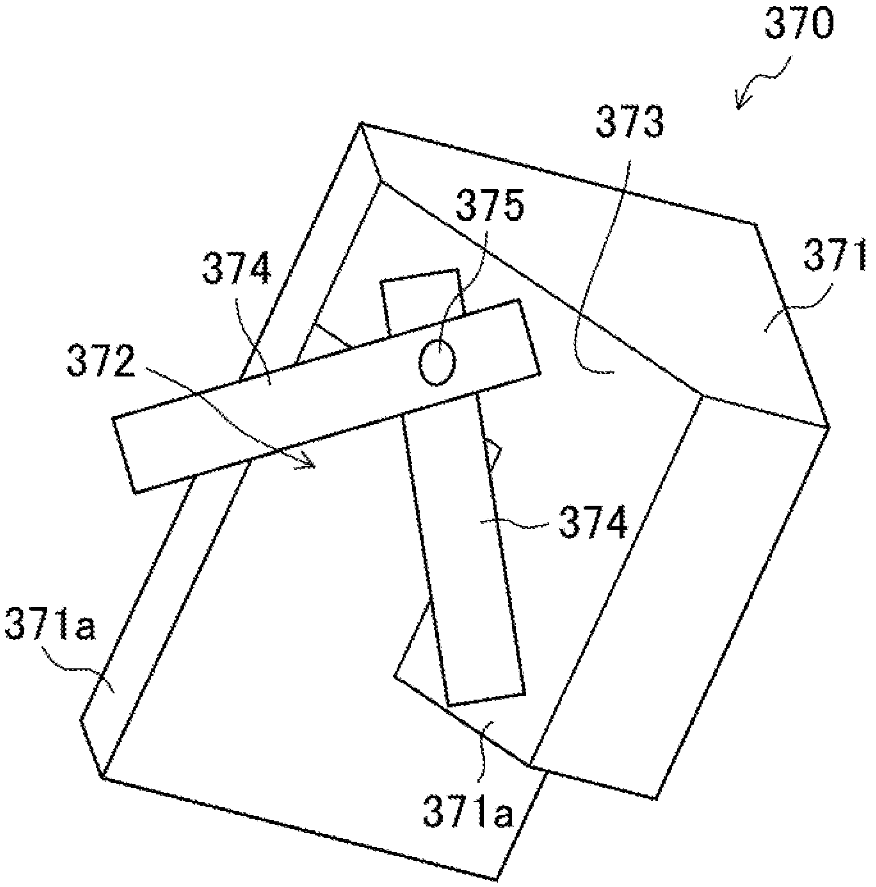
FIG. 11 is a perspective view of a sorting gauge according to Embodiment 3.

The configuration of a sorting gauge 370 according to Embodiment 3 will be described in detail. As illustrated in FIG. 11, the sorting gauge 370 differs from those in Embodiments 1 and 2 described above in that a guide surface 373 is provided with a pair of gate members 374.

Figure 12:
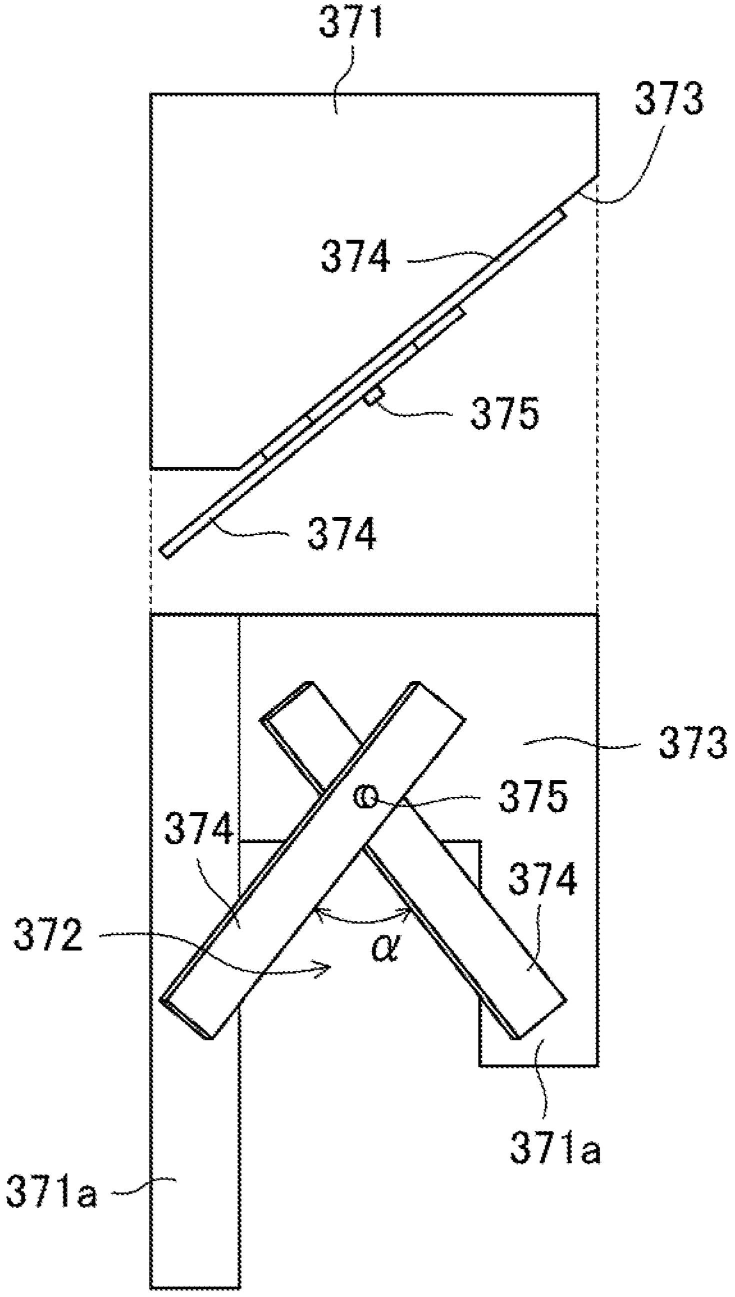
FIG. 12 is a two-side view of the sorting gauge according to Embodiment 3 viewed from the front side and the upstream side in a transport direction.

The pair of gate members 374 constitutes a portion of a sorting path 372. Specifically, a path formed between the pair of gate members 374 constitutes a portion of the sorting path 372. In Embodiment 3, as illustrated in FIG. 12, the sorting path 372 formed between a pair of leg portions 371*a* to extend through a gauge body 371 has a rectangular shape when viewed in the transport direction from the upstream side of the integration path 35. Therefore, the regular bolt RB and the defective bolt BB are substantially sorted by the pair of gate members 374 in the sorting gauge 370 in Embodiment 3.

Figure 15:
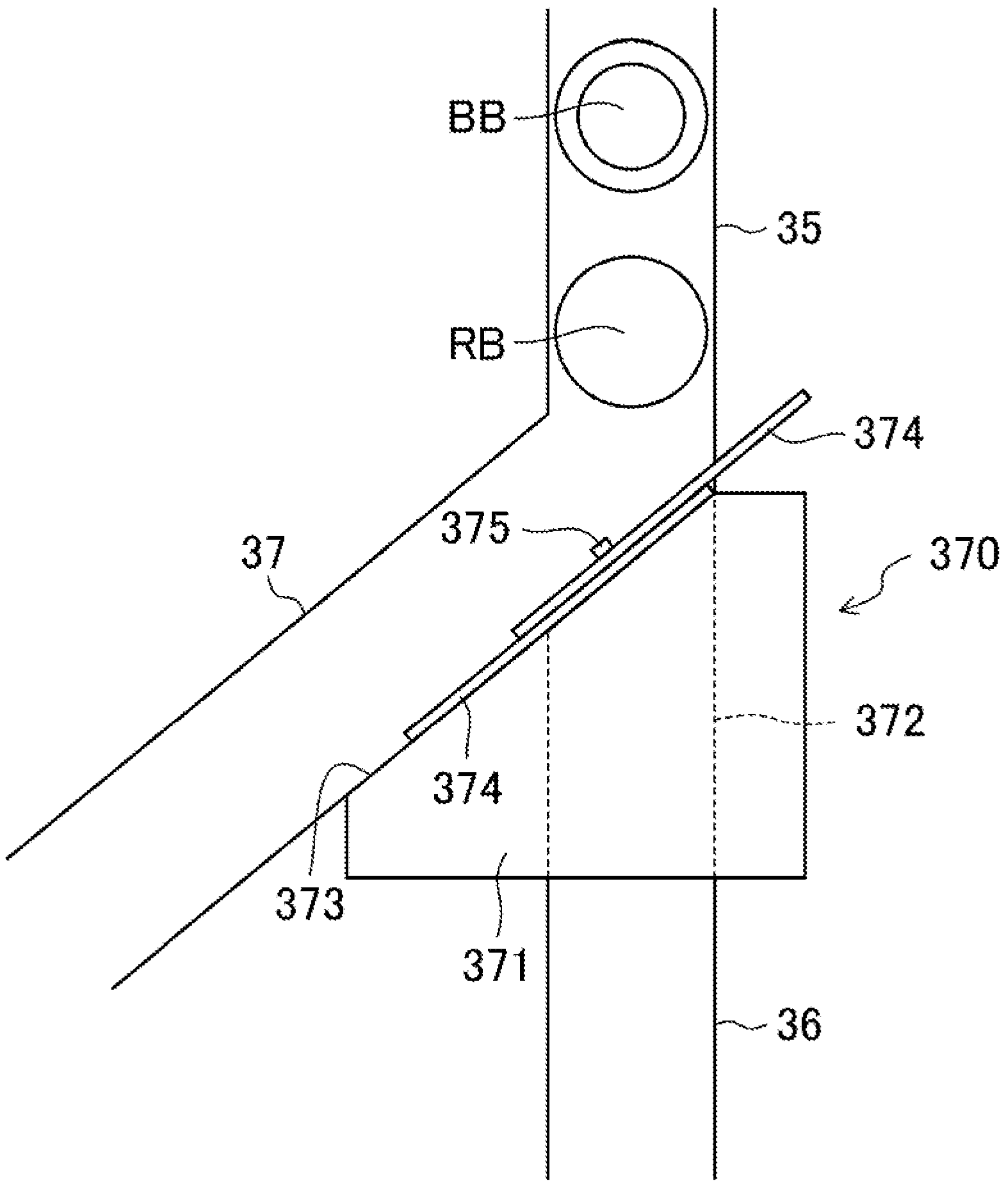
FIG. 15 is an operational view illustrating a status in which components are sorted by the sorting gauge according to Embodiment 3 and illustrates a state of the components being transported along an integration path.
Figure 16:
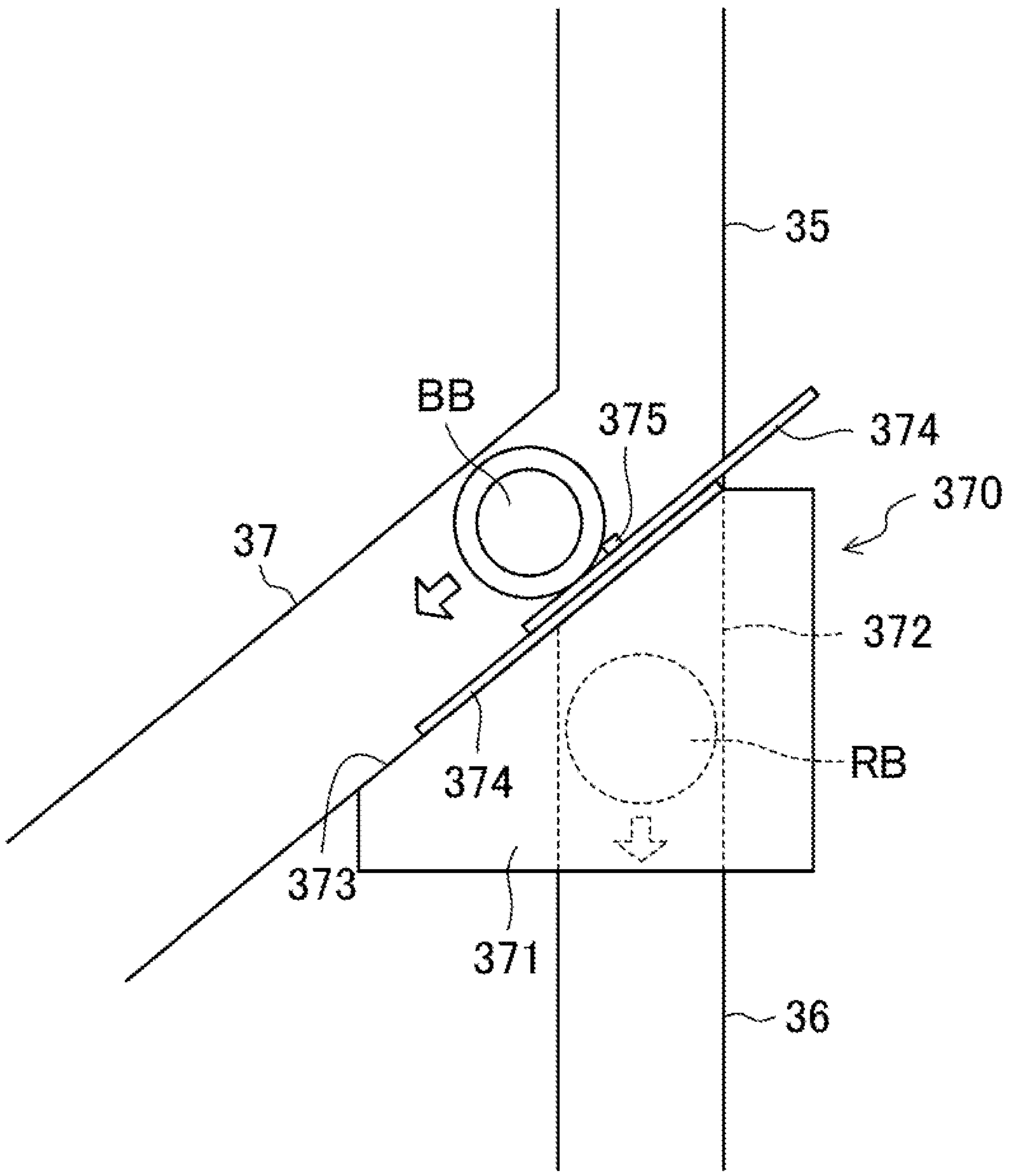
FIG. 16 is an operational view illustrating a status in which components are sorted by the sorting gauge according to Embodiment 3 and illustrates a state of a regular component advancing into a sorting path and a defective component being guided to a discharge path by a guide surface.

The pair of the gate members 374 constitutes a sorting path 372 through which the regular bolt RB is allowed to pass and the defective bolt BB is not allowed to pass. As illustrated in FIG. 11 and FIG. 12, the pair of gate members 374 are each constituted by a plate-shaped blade member. The pair of gate members 374 are attached, in a state in which respective front end portions are superposed on each other, to and supported at the gauge body 371 by an adjustment screw 375. More specifically, the pair of gate members 374 are superposed such that one of the gate members 374 relatively far from the discharge path 37 is on the upper side (the upstream side in the integration path 35) and another one of the gate members 374 relatively close to the discharge path 37 is on the lower side (the downstream side of the integration path 35) in a state of being fixed to the guide plate 30. The pair of gate members 374 are attached to and supported at the gauge body 371 so as to extend along the guide surface 373. Therefore, as illustrated in FIG. 15 and FIG. 16, the gate members 374 also spread toward the discharge path 37. Consequently, the upper faces of the gate members 374 have a function of guiding the defective bolt BB to the discharge path 37 similarly to the guide surface 373. The adjustment screw 375 constitutes an attaching member by which respective one end portions (here, respective front end portions) of the gate members 374 are attached to and supported at the gauge body 371.

The pair of gate members 374 are configured such that an angle therebetween is adjustable. Specifically, when the fastening force of the adjustment screw 375 with respect to the gauge body 71 is reduced, the gate members 374 enter a state of being rotatable around the adjustment screw 375 as the fulcrum. When the fastening force of the adjustment screw 375 with respect to the gauge body 371 is increased again after the angle between the gate members 374 is adjusted to a desired angle in a state in which the adjustment screw 375 is loosened, the angle is fixed in a state of being the desired angle. Consequently, the angle between the gate members 374 can be adjusted to an angle corresponding to the angle of the tip of the regular bolt RB. More specifically, as illustrated in FIG. 12, an angle α (hereinafter, simply referred to as the angle α of the gate members 374) between the gate members 374 when the gate members 374 are viewed in the transport direction from the upstream side of the integration path 35 can be adjusted to an angle corresponding to the angle of the tip of the regular bolt RB. The adjustment screw 375 thus constitutes an angle adjusting mechanism.

Figure 13:
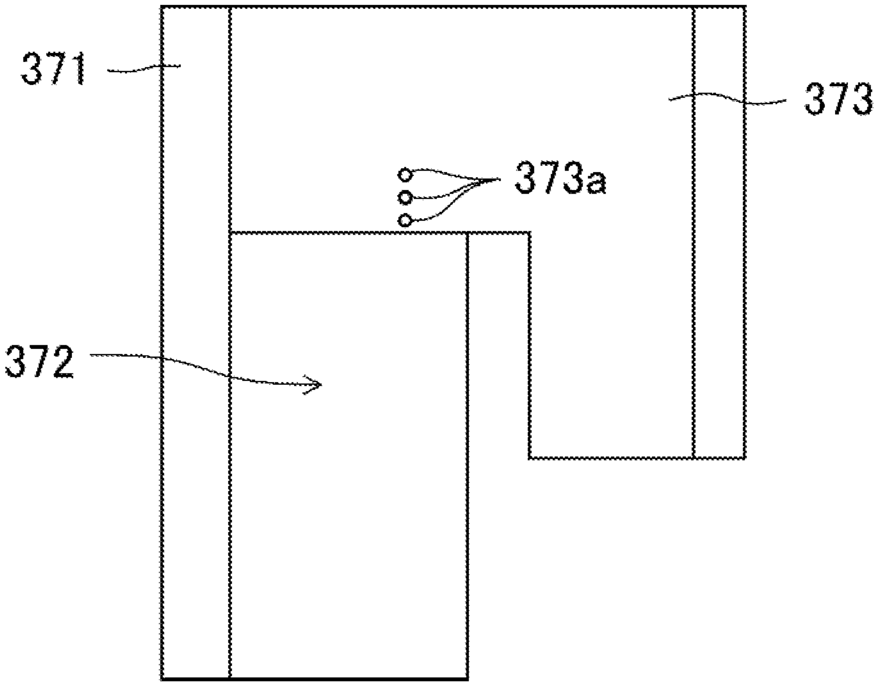
FIG. 13 is a view of the sorting gauge according to Embodiment 3 viewed in a direction perpendicular to a guide surface and illustrates a state in which gate members and an adjustment bolt are detached.

As illustrated in FIG. 13, a portion of the guide surface 373 of the gauge body 371 is provided with a plurality of (three, here) screw holes 373*a* to one of which the adjustment screw 375 is fastened. It is possible to adjust the height position of the gate members 374 with respect to the guide plate 30 by changing the screw hole 373*a* to which the adjustment screw 375 is fastened. Consequently, sorting that uses a difference in lengths of the bolts B is also enabled.

Figure 14A:
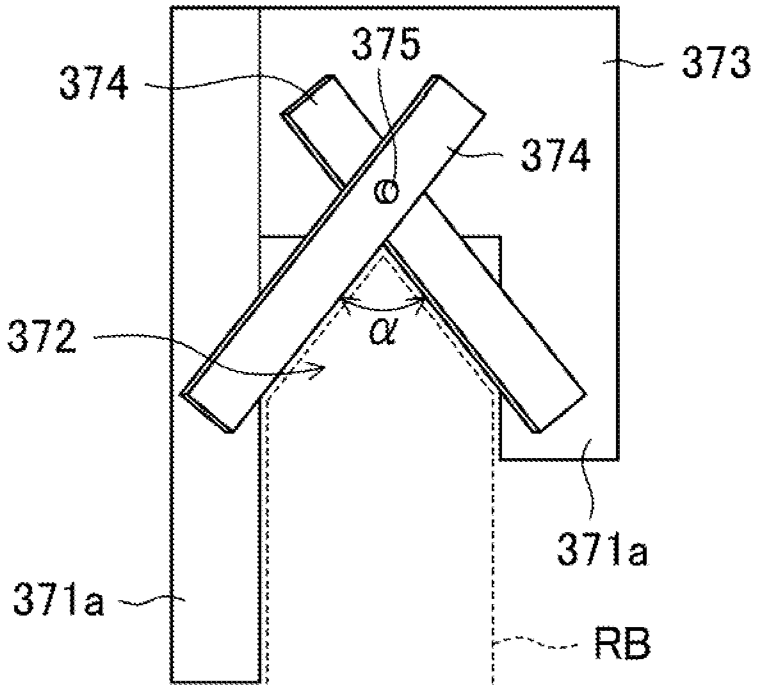
FIG. 14A illustrates a state of the sorting gauge according to Embodiment 3 in which an angle between gate members is changed in accordance with specifications of a bolt.
Figure 14B:
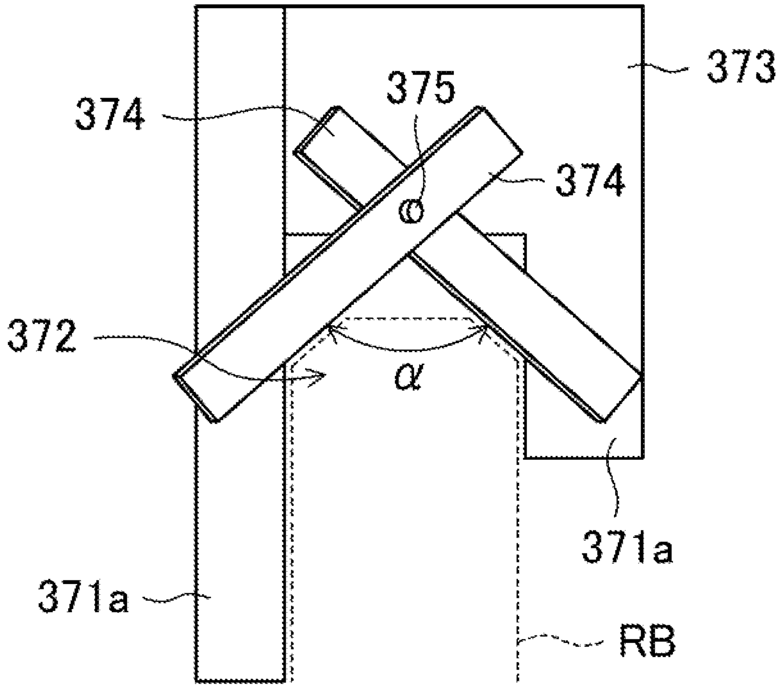
FIG. 14B illustrates a state of the sorting gauge according to Embodiment 3 in which an angle between gate members is changed in accordance with specifications of a bolt.

FIG. 14A and FIG. 14B illustrate examples in which the angle α of the gate members 374 and the height position with respect to the integration path 35 are changed in accordance with the shape of the regular bolt RB. For example, as illustrated in FIG. 14A, when the regular bolt RB is a bolt with a pointed tip, the angle α of the gate members 374 is relatively reduced, and the height position with respect to the integration path 35 is relatively raised. Consequently, for example, a normal flat-tip bolt such as that illustrated in FIG. 14B comes into contact with the gate members 374 and is not possible to pass through the sorting path 372. Meanwhile, as illustrated in FIG. 14B, when the regular bolt RB is a flat-tip bolt, the angle α of the gate members 374 is relatively increased, and the height position with respect to the integration path 35 is relatively lowered. Consequently, a pointed tip bolt such as that illustrated in FIG. 14A comes into contact at the tip portion thereof with the gate members 374 and thus is not possible to pass through the sorting path 372.

Next, sorting of the regular bolt RB and the defective bolt BB by the sorting gauge 70 will be described. Here, it is assumed that the regular bolt RB is a pointed-tip bolt and the defective bolt BB is a flat-tip bolt. The angle α of a pair of gate members 74 is adjusted to an angle corresponding to the regular bolt RB.

First, as illustrated in FIG. 15, the regular bolt RB and the defective bolt BB flow through the integration path 35. At this time, the regular bolt RB and the defective bolt BB are in a state in which respective tip portions protrude from the integration path 35. The regular bolt RB and the defective bolt BB move through the integration path 35 so as to naturally drop due to gravity.

Next, as illustrated in FIG. 16, the regular bolt RB and the defective bolt BB reach the position of the sorting gauge 370. At this time, the regular bolt RB advances into the sorting path 372 formed by the pair of gate members 374. Thereafter, the regular bolt RB advances into the regular transport path 36. After passing through the regular transport path 36, the regular bolt RB enters the rail 6 and is transported.

Meanwhile, the defective bolt BB comes into contact at the tip thereof with the gate members 374. More specifically, the defective bolt BB first comes into contact with the gate member 374 on the side far from the discharge path 37. By coming into contact with the gate member 374, the defective bolt BB receives a lateral force. Consequently, the defective bolt BB is guided along the gate member 374 (in other words, along the guide surface 373) obliquely downward to the left toward the discharge path 37. Next, the defective bolt BB comes into contact with the gate member 374 that is on the side close to the discharge path 37. The defective bolt BB is also guided here along the gate member 374 toward the discharge path 37. Thereafter, the defective bolt BB comes into contact with the guide surface 373 and is guided along the guide surface 373 toward the discharge path 37. Then, after advancing into the discharge path 37, the defective bolt BB moves along the discharge path 37 due to gravity and is discharged through the discharge port 37*a*. After discharged through the discharge port 37*a*, the defective bolt BB enters the box 7.

As described above, the bolts B that have been input from the bolt storage portion 60 into the integration path 35 use the force of moving through the transport path 34 to be sorted into the regular bolt RB and the defective bolt BB by the sorting gauge 370.

When the regular bolt RB is a flat-tip bolt, it is possible to discharge a pointed tip bolt as the defective bolt BB by adjusting the angle α and the height position of the gate members 374 as illustrated in FIG. 14B.

According to Embodiment 3, the sorting gauge 370 includes the pair of gate members 374 constituting a portion of the sorting path 372, and the adjustment screw 375 capable of adjusting the angle between the pair of gate members 374 to an angle corresponding to the angle of the tip of the regular bolt RB. Consequently, the angle α of the pair of gate members 374 can be changed in accordance with the tip shape of the regular bolt RB. When the specifications of the regular bolt RB are changed to specifications in which the tip shape is different, it is sufficient to change the angle α of the pair of gate members 374 in accordance with the tip shape of the regular bolt RB after the change. Therefore, even when the specifications of the regular bolt RB are changed, it is sufficient to change the angle α of the pair of the gate members 374, without detaching the sorting gauge 370 from the guide plate 30. It is thus possible to sort bolts having new specifications by a simple operation. As a result, it is possible to further improve the productivity.

In particular, in Embodiment 3, the gate members 374 are each constituted by a plate-shaped blade member. When the fastening force of the adjustment screw 375 with respect to the gauge body 371 is reduced, respective other end portions of the gate members 374 become rotatable around the adjustment screw 375 as the fulcrum, and, when the fastening force of the adjustment screw 375 with respect to the gauge body 371 is increased, the gate members 374 are fixed in a state in which the angle α of the gate members 374 is a desired angle. Consequently, the sorting path 372 corresponding to various types of bolts can be formed with a simple configuration. It is thus possible to sort various new types of bolts by a simple operation. As a result, it is possible to further improve the productivity.

In Embodiment 3, the gate members 374 are disposed along the guide surface 373. Consequently, the regular bolt RB passes through the sorting path 372 due to a force in the transport direction while the defective bolt BB after coming into contact with the gate members 374 is automatically guided along the guide surface 73 to the discharge path 37 by the force in the transport direction. Consequently, it is possible to further ease the sorting operation and possible to further improve the productivity.

In particular, in Embodiment 3, of the pair of gate members 374, the gate member 374 on the side far from the discharge path 37 is relatively positioned on the upstream side of the integration path 35. Consequently, the flow of the defective bolt BB is inhibited from being blocked by the gate members 374 as a result of the defective bolt BB being caught by the gate members 374 while the defective bolt BB moves toward the discharge path 37. Consequently, the defective bolt BB smoothly flows to the discharge path 37. As a result, the sorting operation can be further eased.

In Embodiment 3, the gauge body 371 is provided with a plurality of the screw holes 373*a* to be configured such that the height position of the gate members 374 with respect to the guide plate 30 can be adjusted by changing the screw hole 373*a* to which the adjustment screw 375 is fastened. Consequently, sorting that uses a difference in lengths of the bolts B is also enabled. It is thus possible to improve sorting accuracy.

Modification of Embodiment 3

Figure 17:
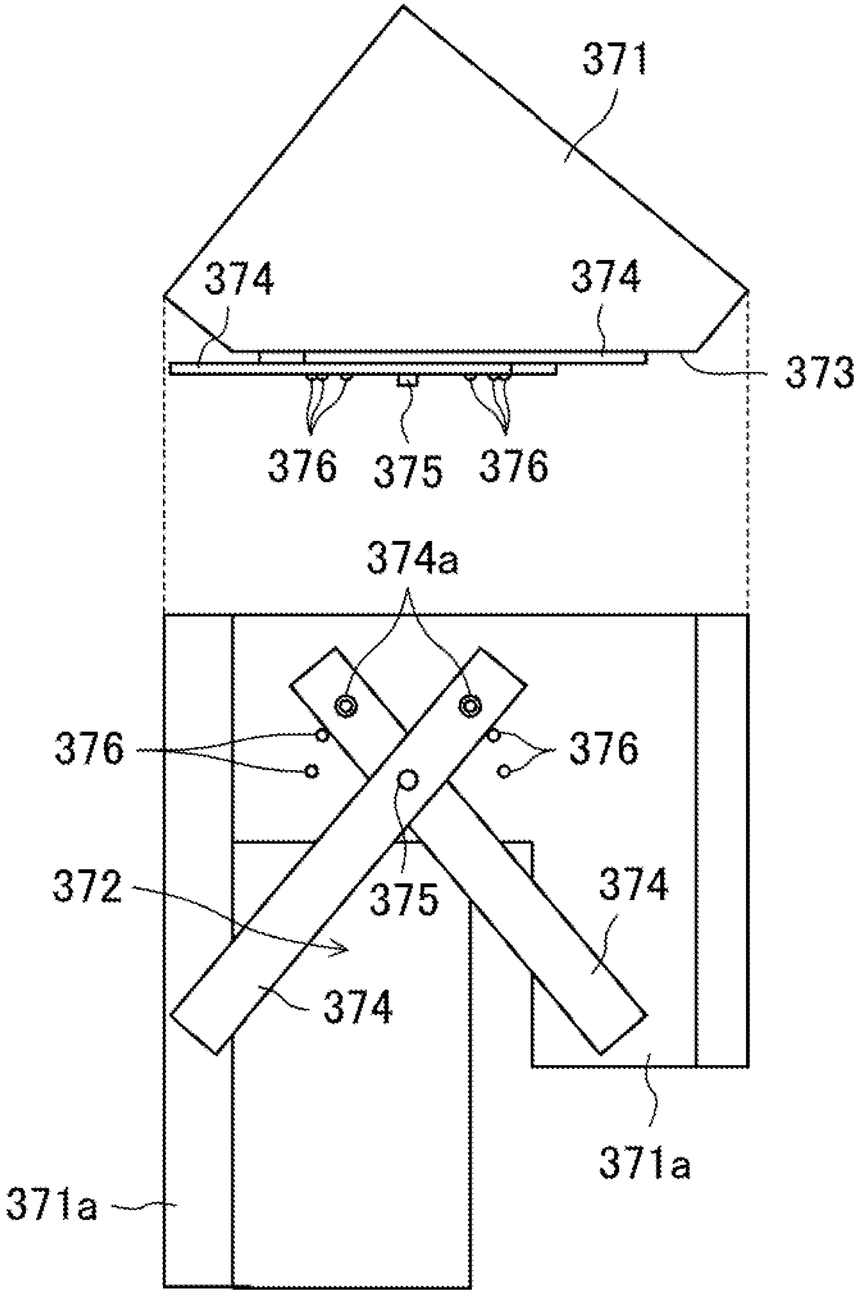
FIG. 17 is a two-side view of a modification of the sorting gauge according to Embodiment 3 viewed from the front side and in a direction perpendicular to a guide surface.

FIG. 17 illustrates a modification of Embodiment 3. In this modification, the guide surface 373 is provided with a plurality of projections 376 that assist setting of the angle of the gate members 374. In addition, engagement holes 374*a* that engage with the projections 376 are provided one each in the gate members 374. When the engagement holes 374*a* of the gate members 374 are engaged with the projections 376, the angle of the gate members 374 is set to a specific angle. When the adjustment screw 375 is tightened in this state, the angle between the gate members 374 can be fixed at the specific angle. Accordingly, the projections 376 constitute a portion of the angle adjusting mechanism.

The projections 376 are positioned in accordance with the tip shape of a typical bolt. Using the engagement holes 374*a* of the gate members 374 and the projections 376 eases setting of the angle of the gate members 374. Consequently, it is possible to sort bolts having various specifications by a simpler operation.

OTHER EMBODIMENTS

The technology disclosed here is not limited to the above-described embodiments and can be replaced within a range not deviating from the gist of the claims.

For example, in Embodiments 1 to 3 described above, the regular transport path 36 is formed continuous with the integration path 35, and the regular bolt RB is allowed to pass through the sorting path. This is, however, a non-limiting example, and a configuration in which the discharge path 37 is formed continuous with the integration path 35 and in which the defective bolt BB is allowed to pass through the sorting path 72 may be employed. In this case, the regular transport path 36 inclines in the groove width direction of the integration path 35 and extends so as to separate from the discharge path 37. In addition, the discharge port 37*a* is open at the lower surface of the guide plate 30, and the box 7 is disposed directly below the discharge port 37*a*. Further, the rail 6 is disposed to be able to receive the regular bolt RB that is input from a left side surface portion of the guide plate 30. Then, the regular bolt RB is guided by the guide surface 73 and moves toward the regular transport path 36.

In addition, in Embodiments 1 to 3 described above, only the sorting gauges 70 or 370 is used to sort the bolts B. This is, however, a non-limiting example, and, for example, the input port 35*a* may be additionally provided with a gauge that sorts the bolts B in accordance with the lengths of the bolts B.

In addition, in Embodiments 1 and 2 described above, the sorting path 72 is formed to extend through the entirety of the gauge body 71, and the guide surfaces 73 and 273 are each formed at the outer peripheral surface of the gauge body 71. This is, however, a non-limiting example, and the gauge body 71 may be machined such that the sorting path 72 is formed to extend from an intermediate portion of the gauge body 71 and the guide surface 73 or 273 is formed at the position of the upstream end of the sorting path 72.

In addition, in Embodiment 2 described above, the protruding portion 274 curves and inclines downward toward the left. This is, however, a non-limiting example, and the protruding portion 274 may be constituted by, for example, an inclined surface whose gradient is larger than the gradient of the guide surface 273.

In addition, in Embodiments 1 and 2 described above, the integration path 35, the regular transport path 36, and the discharge path 37 extend in the up-down direction. This is, however, a non-limiting example, and the extending direction may be the horizontal direction. In this case, a device that moves the bolts B along the integration path 35, the regular transport path 36, and the discharge path 37 similarly to an air supply device or a vibrator device is additionally required.

In addition, in Embodiments 1 and 2 described above, components are bolts B. This is, however, a non-limiting example, and nuts, rivets, and the like may be targeted.

In addition, in Embodiment 3 described above, the gate members 74 are each constituted by a plate-shaped blade member. This is, however, a non-limiting example, and, for example, the gate members 74 may be each constituted by a block body provided at the sorting path 72. In this case, for example, by providing each of the gate members 74 with a gear and rotating the gears in mutually opposite directions, the angle of the gate members 74 can be adjusted.

The above-described embodiments are merely presented as examples, and the scope of the present disclosure should not be interpreted in a limited manner. The scope of the present disclosure is defined by the claims, and modifications and changes belonging to a scope equivalent to the claims are all included in the scope of the present disclosure.

INDUSTRIAL APPLICABILITY

The technology disclosed here is useful as a component transfer device that sorts and supplies a regular component and a defective component that differs in shape from the regular component.

What is claimed is:

1. A component transfer device that is configured to sort and supply a regular component and a defective component that differs in shape from the regular component, the component transfer device comprising:

an integration path through which both of the regular component and the defective component are to be transported; and a sorting gauge that is provided at a downstream end of the integration path and that is configured to sort the regular component and the defective component, wherein:

at the downstream end, the integration path diverges into a regular transport path through which the regular component is to be transported and a discharge path through which the defective component is to be discharged, one of the regular transport path and the discharge path extends to incline in a width direction of the integration path with respect to a transport direction at a portion in a vicinity of the sorting gauge of the integration path, and the sorting gauge includes:

a gauge body, a sorting path into which one of the regular component and the defective component is allowed to advance while another one of the regular component and the defective component is not allowed to advance, the sorting path being formed to extend through the gauge body and to be continuous with another one of the regular transport path and the discharge path, and a guide surface that is disposed at a position of an upstream end of the sorting path in the gauge body so as to spread toward the one of the regular transport path and the discharge path, the guide surface being configured to guide the other one of the regular component and the defective component to the one of the regular transport path and the discharge path when the other one of the regular component and the defective component comes into contact with the guide surface.

2. The component transfer device according to claim 1, wherein:

the sorting path is formed to extend through an entirety of the gauge body, and the guide surface is formed at a portion of an outer peripheral surface of the gauge body.

3. The component transfer device according to claim 2, wherein:

the one of the regular transport path and the discharge path has a groove shape, and the guide surface is disposed to be continuous with a groove wall of the one of the regular transport path and the discharge path.

4. The component transfer device according to claim 3, wherein:

the integration path is formed such that a transport direction is an up-down direction at least at a portion in a vicinity of the sorting gauge, the other one of the regular transport path and the discharge path is formed to extend in the up-down direction and to be continuous with the integration path, and the one of the regular transport path and the discharge path extends downward to obliquely incline so as to separate from the other one of the regular transport path and the discharge path.

5. The component transfer device according to claim 3, wherein:

the sorting gauge further includes, at a portion of the guide surface on a side far from the one of the regular transport path and the discharge path, a protruding portion that protrudes from the guide surface toward a side opposite to the sorting path, and the other one of the regular component and the defective component is guided along the guide surface to the one of the regular transport path and the discharge path after coming into contact with the protruding portion and being guided to the guide surface.

6. The component transfer device according to claim 3, wherein:

components to be transported are bolts, and the sorting gauge further includes:

a pair of gate members through which the one of the regular component and the defective component is allowed to pass while the other one of the regular component and the defective component is not allowed to pass, the pair of gate members constituting at least a portion of the sorting path, and an angle adjusting mechanism that is configured to be capable of adjusting an angle between the pair of gate members to an angle that corresponds to an angle of a tip of the one of the regular component and the defective component.

7. The component transfer device according to claim 6, wherein the gate members are disposed along the guide surface.

8. The component transfer device according to claim 6, wherein:

the gate members are each constituted by a plate-shaped blade member, the angle adjusting mechanism is constituted by an attaching member that is configured to attach respective one end portions of the gate members to the gauge body and support the respective one end portions, and when a joining force of the attaching member with respect to the gauge body is reduced, respective other end portions of the gate members become rotatable around the attaching member as a fulcrum, and, when the joining force of the attaching member with respect to the gauge body is increased, the gate members are fixed in a state in which the angle between the gate members is a desired angle.

9. The component transfer device according to claim 8, wherein the gate members are disposed along the guide surface.

10. The component transfer device according to claim 1, wherein:

the one of the regular transport path and the discharge path has a groove shape, and the guide surface is disposed to be continuous with a groove wall of the one of the regular transport path and the discharge path.

11. The component transfer device according to claim 1, wherein:

the integration path is formed such that a transport direction is an up-down direction at least at a portion in a vicinity of the sorting gauge, the other one of the regular transport path and the discharge path is formed to extend in the up-down direction and to be continuous with the integration path, and the one of the regular transport path and the discharge path extends downward to obliquely incline so as to separate from the other one of the regular transport path and the discharge path.

12. The component transfer device according to claim 1, wherein:

the sorting gauge further includes, at a portion of the guide surface on a side far from the one of the regular transport path and the discharge path, a protruding portion that protrudes from the guide surface toward a side opposite to the sorting path, and the other one of the regular component and the defective component is guided along the guide surface to the one of the regular transport path and the discharge path after coming into contact with the protruding portion and being guided to the guide surface.

13. The component transfer device according to claim 1, wherein:

components to be transported are bolts, and the sorting gauge further includes:

a pair of gate members through which the one of the regular component and the defective component is allowed to pass while the other one of the regular component and the defective component is not allowed to pass, the pair of gate members constituting at least a portion of the sorting path, and an angle adjusting mechanism that is configured to be capable of adjusting an angle between the pair of gate members to an angle that corresponds to an angle of a tip of the one of the regular component and the defective component.

14. The component transfer device according to claim 13, wherein:

the gate members are each constituted by a plate-shaped blade member, the angle adjusting mechanism is constituted by an attaching member that is configured to attach respective one end portions of the gate members to the gauge body and support the respective one end portions, and when a joining force of the attaching member with respect to the gauge body is reduced, respective other end portions of the gate members become rotatable around the attaching member as a fulcrum, and, when the joining force of the attaching member with respect to the gauge body is increased, the gate members are fixed in a state in which the angle between the gate members is a desired angle.

15. The component transfer device according to claim 14, wherein the gate members are disposed along the guide surface.

16. The component transfer device according to claim 13, wherein the gate members are disposed along the guide surface.

* * * * *